US009544661B2

(12) United States Patent
Suh et al.

(10) Patent No.: US 9,544,661 B2
(45) Date of Patent: Jan. 10, 2017

(54) CABLE BROADCAST RECEIVER AND 3D VIDEO DATA PROCESSING METHOD THEREOF

(75) Inventors: Jong Yeul Suh, Seoul (KR); Jeong Hyu Yang, Seoul (KR); Jin Pil Kim, Seoul (KR); Chang Sik Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 803 days.

(21) Appl. No.: 13/394,001

(22) PCT Filed: Sep. 2, 2010

(86) PCT No.: PCT/KR2010/005939
§ 371 (c)(1),
(2), (4) Date: Mar. 2, 2012

(87) PCT Pub. No.: WO2011/028024
PCT Pub. Date: Mar. 10, 2011

(65) Prior Publication Data
US 2012/0154534 A1 Jun. 21, 2012

Related U.S. Application Data
(60) Provisional application No. 61/239,780, filed on Sep. 3, 2009.

(51) Int. Cl.
*H04N 13/00* (2006.01)
*H04N 21/81* (2011.01)
(Continued)

(52) U.S. Cl.
CPC ........ *H04N 21/816* (2013.01); *H04N 13/0048* (2013.01); *H04N 13/0059* (2013.01);
(Continued)

(58) Field of Classification Search
CPC ............ H04N 13/0048; H04N 13/0059; H04N 13/0066; H04N 19/00769
(Continued)

(56) References Cited

U.S. PATENT DOCUMENTS 5,844,478 A * 12/1998 Blatter ................. G11B 27/031
348/460
8,483,269 B2 * 7/2013 Kim et al. ............... 375/240.01
(Continued)

FOREIGN PATENT DOCUMENTS

KR WO 2007/067020 * 12/2006 ............. 348/E13.06
KR 10-2007-0058302 A 6/2007
(Continued)

OTHER PUBLICATIONS

TDVISION Systems, "TDV CODEC-Enabling 3D HD video for massive adoption providing 2D compatibility", www.tdvision.com. Nov. 2008 (Nov. 2008).

*Primary Examiner* — Dave Czekaj
*Assistant Examiner* — Berteau Joisil
(74) *Attorney, Agent, or Firm* — Dentons US LLP

(57) ABSTRACT

A cable broadcast receiver and a 3D video data processing method thereof are disclosed. The processing method includes receiving a cable broadcast signal including video data and SI, determining whether a 3D video service is provided through a channel by obtaining a 3D service ID from SI, obtaining 3D image format information indicating an image format of 3D video data from SI, and extracting 3D video data from the broadcast signal and decoding the extracted result. The broadcast receiver includes a receiving unit receiving a cable broadcast signal including video data and SI, a control unit determining whether a 3D video service is provided through a channel by obtaining a 3D service ID from the SI, and obtaining 3D image format information indicating an image format of 3D video data
(Continued)

from the SI, and a video decoder extracting 3D video data from the broadcast signal, and decoding the extracted result.

12 Claims, 19 Drawing Sheets

(51) Int. Cl.
    *H04N 21/434* (2011.01)
    *H04N 21/44* (2011.01)
    *H04N 21/4402* (2011.01)
    *H04N 21/61* (2011.01)
    *H04N 19/597* (2014.01)

(52) U.S. Cl.
    CPC ....... *H04N 13/0066* (2013.01); *H04N 19/597* (2014.11); *H04N 21/4345* (2013.01); *H04N 21/4402* (2013.01); *H04N 21/44008* (2013.01); *H04N 21/6118* (2013.01)

(58) Field of Classification Search
    USPC .......................................................... 348/43
    See application file for complete search history.

(56) References Cited

U.S. PATENT DOCUMENTS

| 8,730,303 | B2* | 5/2014 | Suh .................... H04N 13/0048 348/43 |
| 2006/0031895 | A1 | 2/2006 | Kwon et al. | |
| 2006/0164411 | A1* | 7/2006 | Lee .................... H04N 13/0275 345/419 |
| 2008/0310499 | A1* | 12/2008 | Kim ...................... H04H 20/95 375/240.01 |
| 2010/0161686 | A1* | 6/2010 | Yun ..................... H04N 13/0066 707/812 |
| 2011/0242278 | A1* | 10/2011 | Yang et al. ..................... 348/43 |
| 2013/0002819 | A1* | 1/2013 | Lee et al. ........................ 348/43 |

FOREIGN PATENT DOCUMENTS

| KR | 10-2009-0062216 A | 6/2009 |
| WO | 2008156318 A2 | 12/2008 |

* cited by examiner

Fig. 3
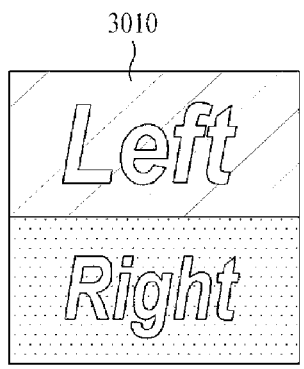
Top-Bottom, left first,
normal orientation
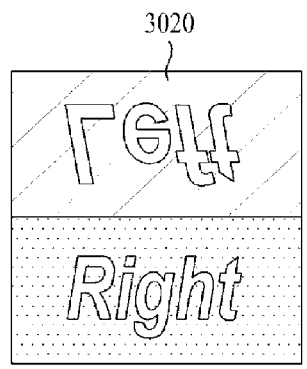
Top-Bottom, left first,
left inverted
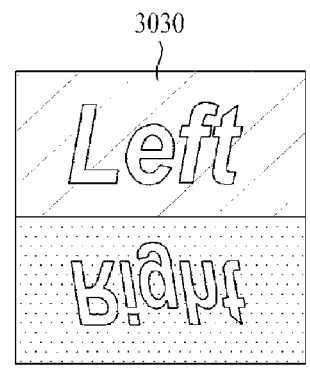
Top-Bottom, left first,
right inverted
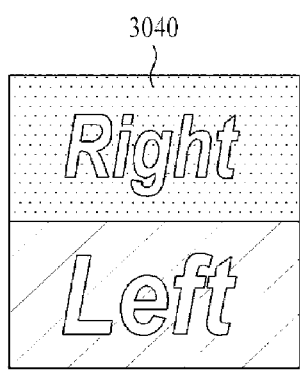
Top-Bottom, right first,
normal orientation
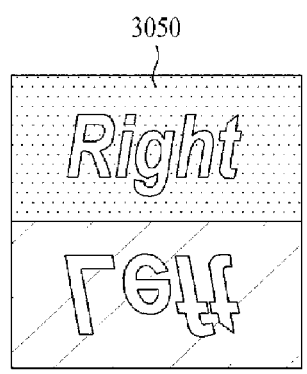
Top-Bottom, right first,
left inverted
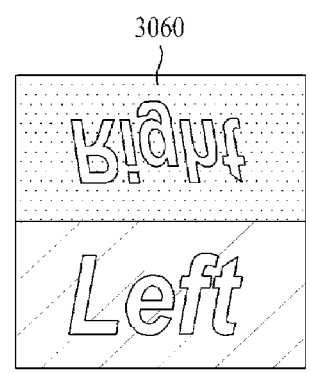
Top-Bottom, right first,
right inverted

Fig. 5

| Syntax | Bits | Bytes | Format |
|---|---|---|---|
| longform_virtual_channel_table_section () { | | | |
|     table_id | 8 | 1 | 0xC9 |
|     section_syntax_indicator | 1 | 2 | '1' |
|     private_indicator | 1 | | '1' |
|     reserved | 2 | | '11' |
|     section_length | 12 | | uimsbf |
|     map_ID | 16 | 2 | uimsbf |
|     reserved | 2 | 1 | '11' |
|     version_number | 5 | | uimsbf |
|     current_next_indicator | 1 | | bslbf |
|     section_number | 8 | 1 | uimsbf |
|     last_section_number | 8 | 1 | uimsbf |
|     protocol_version | 8 | 1 | uimsbf |
|     num_channels_in_section | 8 | 1 | uimsbf |
|     for(i=0;i<num_channels_in_section;i++) { | | | |
|         short_name | 7*16 | (14) | unicode™BMP |
|         reserved | 4 | (3) | '1111' |
|         major_channel_number | 10 | | uimsbf |
|         minor_channel_number | 10 | | uimsbf |
|         modulation_mode | 8 | (1) | uimsbf |
|         carrier_frequency | 32 | (4) | uimsbf |
|         channel_TSID | 16 | (2) | uimsbf |
|         program_number | 16 | (2) | uimsbf |
|         reserved | 2 | (2) | '11' |
|         access_controlled | 1 | | bslbf |
|         hidden | 1 | | bslbf |
|         path_select | 1 | | bslbf |
|         out_of_band | 1 | | bslbf |
|         hide_guide | 1 | | bslbf |
|         reserved  5010 | 3 | | '111' |
|         service_type | 6 | | uimsbf |
|         source_id | 16 | (2) | uimsbf |
|         reserved | 6 | (2) | '111111' |
|         descriptors_length | 10 | | uimsbf |
|         for (i=0;i<N;i++) {  5020 | | | |
|             descriptors() | | | |
|         } | | | |
|     } | | | |
|     reserved | 6 | 2 | '111111' |
|     additional_descriptors_length | 10 | | uimsbf |
|     for(j=0; j<N;j++) { | | | |
|         additional_descriptors() | | var | |
|     } | | | |
|     CRC_32 | 32 | 4 | rpchof |
| } | | | |

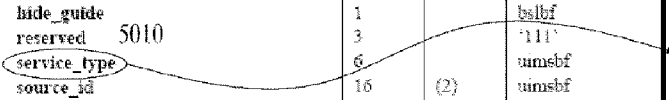 indicating 3DTV service

Fig. 6

| shortform_virtual_channel_table_section(){ | Bits | Bytes | Format |
|---|---|---|---|
| table_ID | 8 | 1 | uimsbf value 0xC4 |
| zero | 2 | 2 | bslbf |
| reserved | 2 | | bslbf |
| section_length | 12 | | uimsbf |
| zero | 3 | 1 | bslbf |
| protocol_version | 5 | | see Sec. 4.4.1 |
| transmission_medium | 4 | 1 | uimsbf |
| table_subtype | 4 | | uimsbf see Table 5.14 |
| VCT_ID | 16 | 2 | uimsbf |
| if (table_subtype==DCM) { | | | |
|   DCM_structure() | * | (*) | |
| } | | | |
| if (table_subtype== VCM) { | | | |
|   VCM_structure() | | | |
| } | | | |
| if (table_subtype== ICM) { | | | |
|   ICM_structure() | | | |
| } | | | |
| for (i=0; i<N; i++) { | | | |
|   descriptor() | | | |
| } | | | |
| CRC_32 | | | |
| } | | | |

6030

VCM_structure() — 6070

| VCM_structure(){ | Bits | Bytes | Format |
|---|---|---|---|
| zero | 2 | 1 | bslbf |
| descriptors_included | 1 | | bslbf (no, yes) |
| zero | 5 | | bslbf |
| splice | 1 | 1 | bslbf (no, yes) |
| zero | 7 | | bslbf |
| activation_time | 32 | 4 | uimsbf |
| number_of_VC_records | 8 | 1 | uimsbf |
| for (i=0; i<number_of_VC_records; i++) { | | | |
|   virtual_channel() | * | (*) | |
| } | | | |
| } | | | |

6020 virtual_channel() — 6060

| virtual_channel(){ | | | |
|---|---|---|---|
| zero | 4 | 2 | bslbf |
| virtual_channel_number | 12 | | uimsbf range 0-4095 |
| application_virtual_channel | 1 | 1 | bslbf (no, yes) |
| zero | 1 | | bslbf |
| path_select | 1 | | bslbf see Table 5.18 |
| transport_type | 1 | | bslbf see Table 5.19 |
| channel_type | 4 | | uimsbf see Table 5.20 |
| if (application_virtual_channel) { | | | |
|   application_ID | 16 | (2) | |
| } else { | | | |
|   source_ID | 16 | (2) | |
| } | | | |
| if (transport_type==MPEG_2) { | | | |
|   CDS_reference | 8 | ((1)) | uimsbf range 1-255 |
|   program_number | 16 | ((2)) | |
|   MMS_reference | 8 | ((1)) | uimsbf range 1-255 |
| } else { /* non-MPEG-2 */ | | | |
|   CDS_reference | 8 | ((1)) | uimsbf range 0-255 |
|   scrambled | 1 | ((1)) | bslbf (no, yes) |
|   zero | 3 | | bslbf |
|   video_standard | 4 | | uimsbf see Table 5.21 |
|   zero | 16 | ((2)) | bslbf |
| } | | | |
| if (descriptors_included) { | | | |
|   descriptors_count | 8 | (1) | uimsbf |
|   for (j=0; j<descriptors_count; j++) { | | | |
|     descriptor() | * | ((*)) | |
|   } | | | |
| } | | | |
| } | | | |

6040 (channel_type) → indicating 3DTV service 6050 (descriptor())

| Syntax | No. of Bits | Format |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for(i=0; i<N; i--) { | | |
|         descriptor() | | |
|     } | | |
|     for(i=0; i<N1; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for(i=0; i<N2; i++) { | | |
|             descriptor() —8010 | | |
|         } | | |
|     } | | |
|     CRC_32 | 32 | rpchof |
| } | | |

Fig. 9

| Syntax | No. of bits | Format |
|---|---|---|
| stereo_format_descriptor ( ) { | | |
|     descriptor_tag | 8 | 0xTBD |
|     descriptor_length | 8 | uimsbf |
|     stereo_composition_type | 8 | uimsbf |
|     reserved | 4 | '1111' |
|     LR_first_flag | 1 | bslbf |
|     spatial_flipping_flag | 1 | bslbf |
|     image0_flipped_flag | 1 | bslbf |
|     quincunx_filtering_flag | 1 | bslbf |
| } | | |

Fig. 10

| Syntax | No. of bits | Format |
|---|---|---|
| stereo_format_descriptor ( ) { | | |
|     descriptor_tag | 8 | 0xTBD |
|     descriptor_length | 8 | uimsbf |
|     service_type | 8 | uimsbf |
|     stereo_composition_type | 8 | uimsbf |
|     reserved | 4 | '1111' |
|     LR_first_flag | 1 | bslbf |
|     spatial_flipping_flag | 1 | bslbf |
|     image0_flipped_flag | 1 | bslbf |
|     quincunx_filtering_flag | 1 | bslbf |
| } | | |

Fig. 11

| LR_first_flag | spatial_flipping_flag | image0_flipped_flag | description |
|---|---|---|---|
| 0 | 0 | - | Left first, normal orientation |
| 0 | 1 | 1 | Left first, right image inverted/mirrored |
| 0 | 1 | 0 | Left first, left image inverted/mirrored |
| 1 | 0 | - | Right first, normal orientation |
| 1 | 1 | 1 | Right first, left image inverted/mirrored |
| 1 | 1 | 0 | Right first, right image inverted/mirrored |

CABLE BROADCAST RECEIVER AND 3D VIDEO DATA PROCESSING METHOD THEREOF

This application claims the benefit of priority of U.S. Provisional Application No. 61/239,780 filed on Sep. 3, 2009 and PCT Application No. PCT/KR2010/005939 filed on Sep. 2, 2010, all of which are incorporated by reference in their entirety herein.

TECHNICAL FIELD

The present invention relates to an apparatus and method for processing a broadcast signal, and more particularly to a cable broadcast receiver for processing 3D video data when a cable broadcast system transmits a broadcast signal including 3D video data, and a 3D video data processing method for use in the cable broadcast receiver.

BACKGROUND ART

Generally, a three dimensional (3D) image (or a stereoscopic image) provides a user's eyes with a stereoscopic effect using the stereoscopic visual principle. A human being feels both near and far through a binocular parallax caused by a distance between their eyes spaced apart from each other by about 65 mm, such that the 3D image enables both right and left eyes to respectively view associated planar images, resulting in the stereoscopic effect and the perspective effect.

The above-mentioned 3D image display method may be classified into a stereoscopic scheme, a volumetric scheme, a holographic scheme, etc. In case of using the stereoscopic scheme, the 3D image display method provides a left view image to be viewed by the left eye and a right view image to be viewed by the right eye, such that the user's left eye views the left view image and the user's right eye views the right view image through either polarization glasses or a display device, resulting in recognition of the 3D image effect.

DISCLOSURE OF INVENTION

Technical Problem

Accordingly, the present invention is directed to a cable broadcast receiver and a 3D video data processing method thereof, that substantially obviate one or more problems due to limitations and disadvantages of the related art.

An object of the present invention is to provide a cable broadcast receiver and a 3D video data processing method thereof, which perform signaling of information about 3D video data when a cable broadcast system transmits the 3D video data for stereoscopic display, and process the 3D video data using the signaling information, thus providing a user with more effective and convenient broadcast environments.

Solution to Problem

The object of the present invention can be achieved by providing a three dimensional (3D) video data processing method for use in a cable broadcast receiver, the method including receiving a cable broadcast signal including video data and system information, determining whether a 3D video service is provided through a corresponding channel by obtaining a 3D service identifier (ID) from the system information, obtaining 3D image format information indicating an image format of 3D video data from the system information, and extracting 3D video data from the cable broadcast signal, and decoding the extracted 3D video data.

In another aspect of the present invention, provided herein is a cable broadcast receiver including a receiving unit for receiving a cable broadcast signal including video data and system information, a control unit for determining whether a 3D video service is provided through a corresponding channel by obtaining a 3D service identifier (ID) from the system information, and obtaining 3D image format information indicating an image format of 3D video data from the system information, and a video decoder for extracting 3D video data from the cable broadcast signal, and decoding the extracted 3D video data.

Advantageous Effects of Invention

According to embodiments of the present invention, the broadcast receiver can process 3D video data such that a 3D effect intended by a 3D broadcast service provider is reflected in the 3D broadcast service.

In addition, the embodiments of the present invention can effectively provide a 3D broadcast service simultaneously while minimizing the effect on a conventional 2D broadcast service.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 3 shows an image forming method when a stereoscopic image is multiplexed using a top-bottom scheme according to an embodiment of the present invention.

FIG. 5 shows a syntax structure of a Longform Virtual Channel Table (LVCT) for identifying whether a 3D broadcast service is provided according to an embodiment of the present invention.

FIG. 6 shows a syntax structure of a Shortform Virtual Channel Table (SVCT) for identifying whether a 3D broadcast service is provided according to an embodiment of the present invention.

FIG. 7 shows a syntax structure of a Shortform Virtual Channel Table (SVCT) for identifying whether a 3D broadcast service is provided according to another embodiment of the present invention.

FIG. 8 shows a syntax structure of a Program Map Table (PMT) including stereo format information according to an embodiment of the present invention.

FIG. 9 shows a syntax structure of a stereo format descriptor according to an embodiment of the present invention.

FIG. 10 shows a syntax structure of a stereo format descriptor according to another embodiment of the present invention.

FIG. 11 shows 3D video data in response to a field value contained in a stereo format descriptor according to an embodiment of the present invention.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Prior to describing the present invention, it should be noted that most terms disclosed in the present invention are defined in consideration of functions of the present invention and correspond to general terms well known in the art, and can be differently determined according to intention of those skilled in the art, usual practices, or introduction of new technologies. In some cases, a few terms have been selected by the applicant as necessary and will hereinafter be disclosed in the following description of the present invention. Therefore, it is preferable that the terms defined by the applicant be understood on the basis of their meanings in the present invention.

Figure 1:
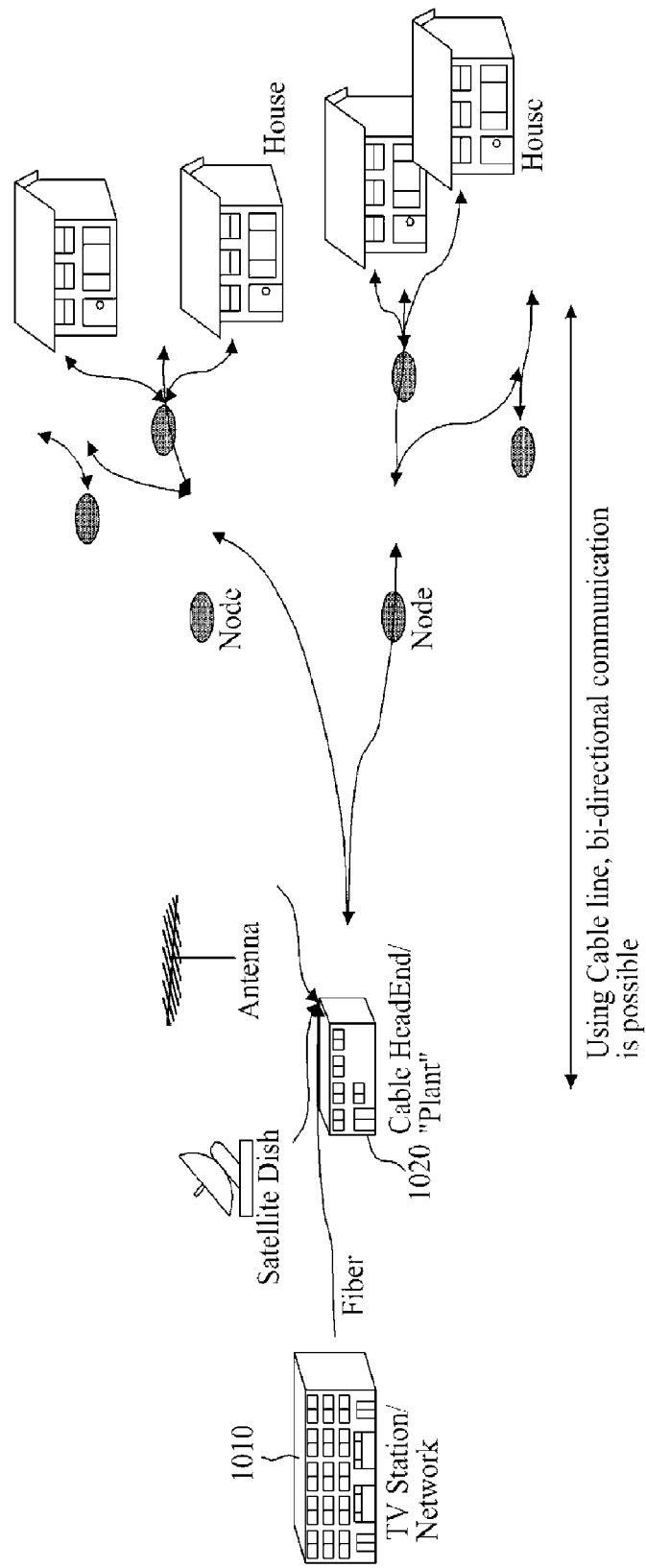
FIG. 1 is a conceptual diagram illustrating a cable broadcast network according to an embodiment of the present invention.

FIG. 1 is a conceptual diagram illustrating a cable broadcast network according to an embodiment of the present invention.

Referring to FIG. 1, the cable broadcast network may be generally classified into a transmission side and a reception side. The transmission side may include a TV station 1010; and a cable headend or plant 1020 for receiving broadcast content from a content provider such as the TV station 1010 over various communication networks. The cable headend or plant 1020 may also be considered to be a service provider or network provider that provides a broadcast service over a cable network.

The reception side may include a variety of broadcast receivers for receiving a cable broadcast signal through a node that manages/distributes a broadcast signal over the cable network. The broadcast receiver may include a variety of devices for receiving/processing a digital broadcast signal, for example, a set-top box, a digital TV, etc.

The cable broadcast network basically provides a 2D broadcast service. If a 3D broadcast service for vividly providing content begins and is only transmitted instead of a 2D broadcast service, various problems may occur in the reception side, for example, a malfunction, defective displaying of content of the reception side, etc.

Therefore, a method for signaling information about the 3D broadcast service and a method for receiving/processing 3D video data when a cable broadcast system provides the 3D broadcast service according to embodiments of the present invention will hereinafter be described with reference to the annexed drawings.

The 3D image display method includes a stereoscopic imaging scheme in which two viewpoints are considered and a multi-view imaging scheme in which three or more viewpoints are considered. In contrast, a single view image scheme shown in the related art may also be referred to as a monoscopic image scheme.

The stereoscopic imaging scheme is designed to use one pair of right and left view images acquired when a left-side camera and a right-side camera spaced apart from each other by a predetermined distance capture the same target object. The multi-view imaging scheme uses three or more images captured by three or more cameras spaced apart by a predetermined distance or angle. Although the following description discloses embodiments of the present invention using the stereoscopic imaging scheme as an example, the inventive concept of the present invention may also be applied to the multi-view imaging scheme. For convenience of description and better understanding of the present invention, the term 'stereoscopic' may also be referred to as 'stereo' as necessary.

A stereoscopic image or multi-view image may be compressed and coded according to a variety of methods including a Moving Picture Experts Group (MPEG) scheme, and transmitted to a destination.

For example, a stereoscopic image or a multi-view image may be compressed and coded according to the H.264/Advanced Video Coding (AVC) scheme, and transmitted. In this case, the reception system may decode a received image in reverse order of the H.264/AVC coding scheme, such that it is able to obtain the 3D image.

In addition, one of a left view image and a right view image of a stereoscopic image or one of multiple-view images may be assigned to an image of a base layer, and the remaining one may be assigned to an image of an extended layer. The base layer image may be encoded using the same method as the monoscopic imaging method. In association with the extended layer image, only information of the relationship between the base layer image and the extended layer image may be encoded and transmitted. As an exemplary compression coding scheme for the base layer image, a JPEG, an MPEG-2, an MPEG-4, or a H.264/AVC scheme may be used. For convenience of description, the H.264/AVC scheme may be exemplarily used in one embodiment of the present invention. In one embodiment of the present invention, the compression coding scheme for an image of an upper or higher layer may be set to the H.264/Multi-view Video Coding (MVC) scheme.

The stereoscopic image has two kinds of transmission formats, i.e., a single-video stream format and a multi-video stream format. The single-video stream format multiplexes two-viewpoint video data to a single video stream, and transmits the multiplexed video stream result. As a result, the single-video stream format transmits video data through a single video stream, such that it has an advantage in that it does not require a wide additional bandwidth. The multi-video stream format transmits a plurality of data through a plurality of video streams, such that it can transmit a large amount of data whereas it consumes a wider bandwidth, resulting in the implementation of a display of high-quality video data.

Figure 2:
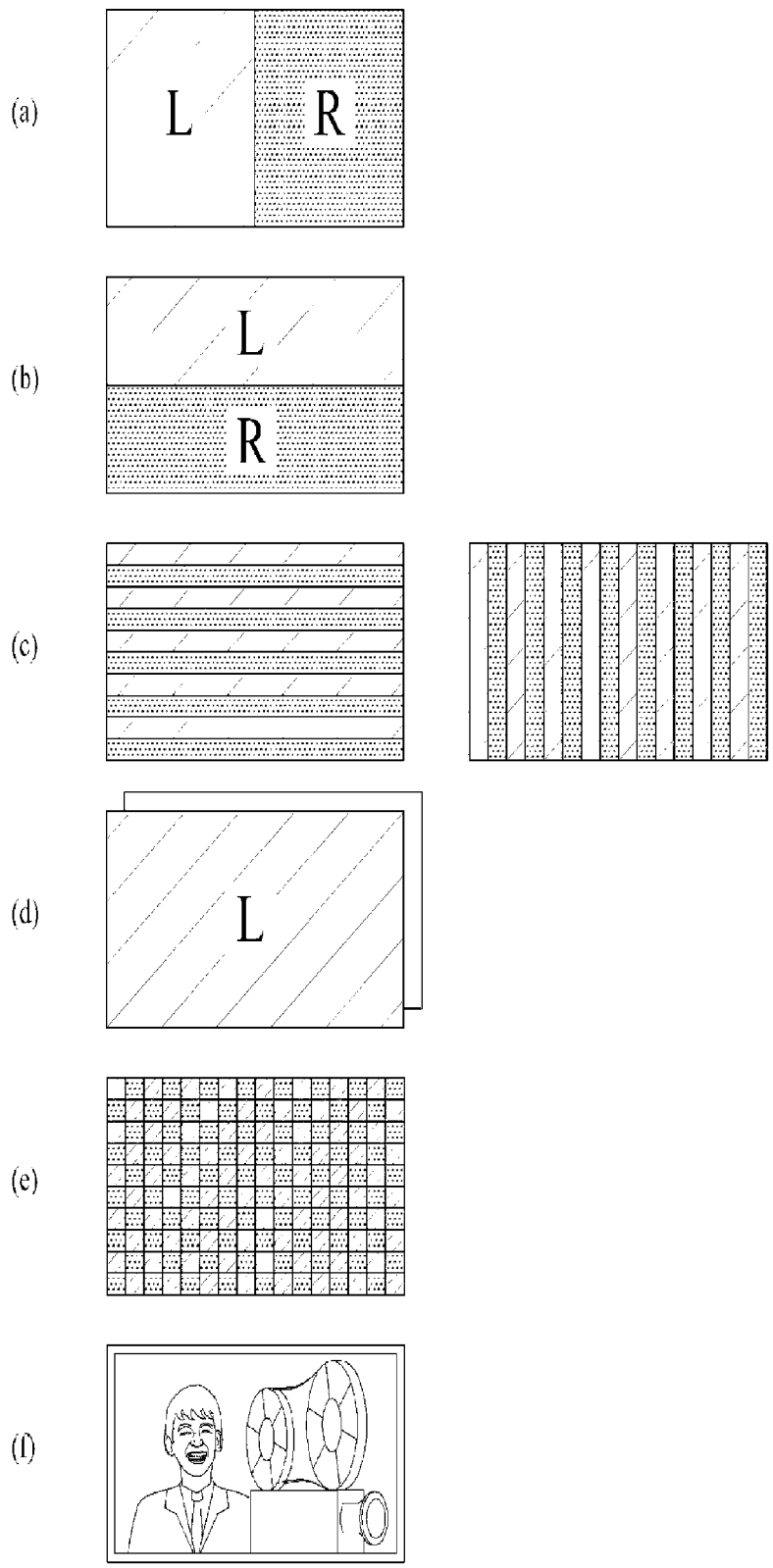
FIG. 2 is a conceptual diagram illustrating a stereoscopic image multiplexing format of a single video stream format according to an embodiment of the present invention.

FIG. 2 is a conceptual diagram illustrating a stereoscopic image multiplexing format of a single video stream format according to an embodiment of the present invention.

There are a variety of single video stream formats, for example, a side-by-side format shown in FIG. 2(a), a top-bottom format shown in FIG. 2(b), an interlaced format shown in FIG. 2(c), a frame sequential format shown in FIG. 2(d), a checkerboard format shown in FIG. 2(e), an anaglyph format shown in FIG. 2(f), etc.

In accordance with the side-by-side format shown in FIG. 2(a), each of left image data (also called left view data) and right image data (also called right view data) is ½ down-sampled in a horizontal direction, the sampled left image data is located at the left side of a display screen, and the sampled right image data is located at the right side of the display screen, so that a single stereoscopic image is formed. In accordance with the top-bottom format shown in FIG. 2(b), each of the left image data and the right image data is ½ down-sampled in a vertical direction, the sampled left image data is located at an upper part of a display screen, and the sampled right image data is located at a lower part of the display screen, so that a single stereoscopic image is formed. In accordance with the interlaced format shown in FIG. 2(c), each of the left image data and the right image data is ½ down-sampled in a horizontal direction, and a pixel of the sampled left image data and a pixel of the sampled right image data are alternately arranged at every line so that one stereoscopic image composed of two images is formed. In addition, each of the left image data and the right image data is ½ down-sampled in a vertical direction, and a pixel of the sampled left image data and a pixel of the sampled right image data are alternately arranged at every line so that one stereoscopic image composed of two images is formed. In accordance with the frame sequential format shown in FIG. 2(d), left image data and right image data are alternately arranged in time within one video stream so that a stereoscopic image is formed. In accordance with the checkerboard format shown in FIG. 2(e), left image data and right image data are ½ sub-sampled in vertical and horizontal directions such that the left image data and the right image are alternately arranged in vertical and horizontal directions so that two images are integrated into one image. In accordance with the anaglyph format shown in FIG. 2(f), an image is formed using a complementary color contrast so as to implement the stereoscopic effect.

In order to effectively demultiplex video data using the above-mentioned schemes and process the demultiplexed video data, it is necessary for the reception system to transmit information about the above-mentioned multiplexing formats.

In FIG. 2, when transmitting video data using the side-by-side scheme or the top-bottom scheme, two video images, each of which is ½ down-sampled, are transmitted, such that each of the two video images has a resolution of ½. However, video data amount consumed when two half-resolution images are transmitted may be larger than video data amount consumed when one full-resolution image is transmitted. For example, when video data is coded differently from a reference image in such a manner that a difference between the video data and the reference image appears, a video compression rate may be increased. In this case, if an overall compression rate of two half-resolution video data is less than a compression rate of one full-resolution video data, video data amount when two half-resolution images are transmitted may be larger than video data amount when one full-resolution image is transmitted. In order to increase a data compression rate when a transmission system transmits data, one of the two images may be inverted in a vertical direction or may be mirrored in horizontal direction. The inverting or mirroring of the image may hereinafter be referred to as only 'image flipping' for convenience of description and better understanding of the present invention.

FIG. 3 shows an image forming method when a stereoscopic image is multiplexed using a top-bottom scheme according to an embodiment of the present invention.

In case of each image 3010, 3020 or 3030, a left image is located at the top and a right image is located at the bottom. In case of each image 3040, 3050 or 3060, a left image is located at the bottom and a right image is located at the top.

In the image 3010, a left image and a right image are normally oriented (normal orientation). In the image 3020, a left image located at the top is inverted. In the image 3030, a right image located at the bottom is inverted. In the image 3040, a right image and a left image are normally oriented. In the image 3050, a left image located at the bottom is inverted. In the image 3060, a right image located at the bottom is inverted.

Figure 4:
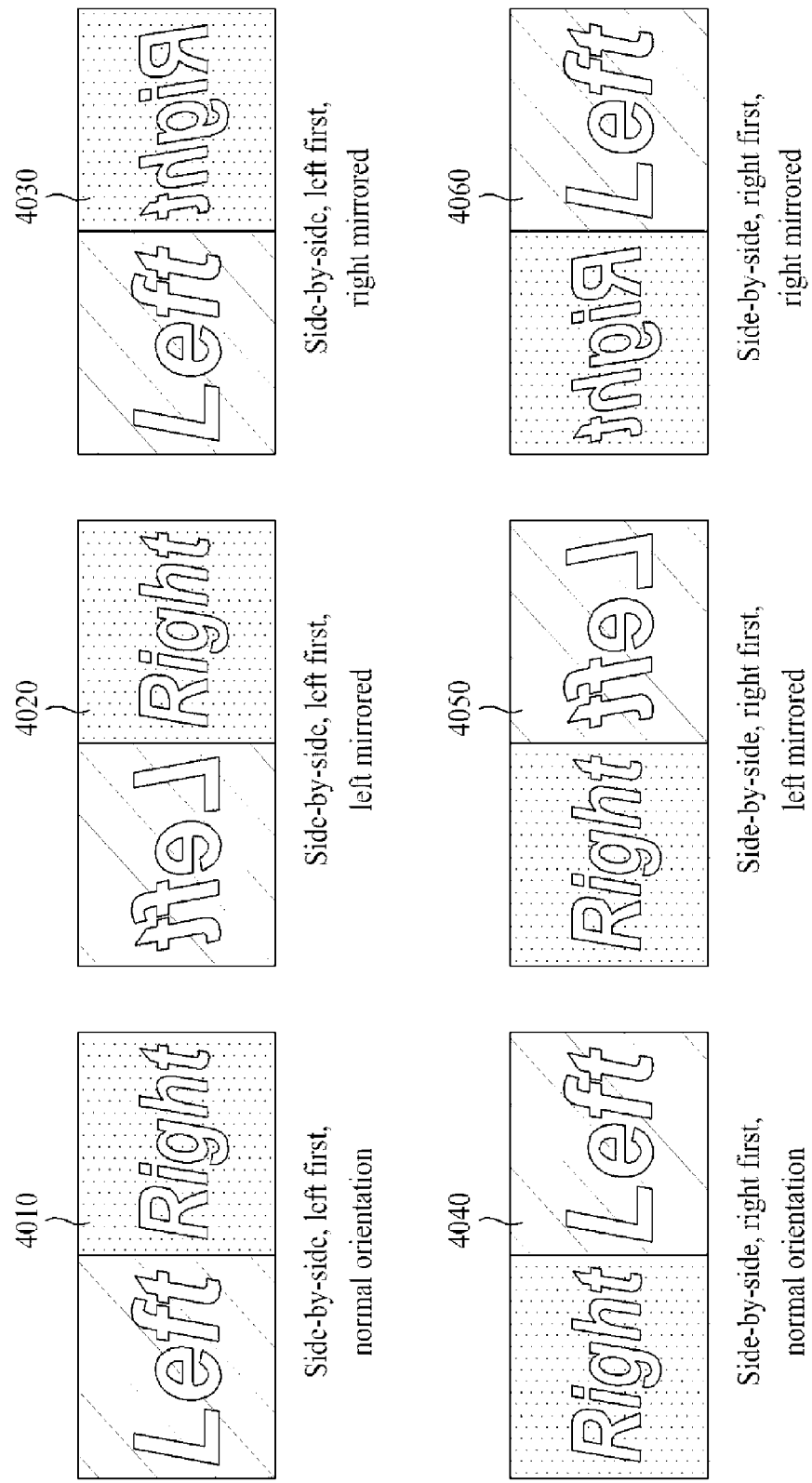
FIG. 4 shows an image forming method when a stereoscopic image is multiplexed using a side-by-side scheme according to an embodiment of the present invention.

FIG. 4 shows an image forming method when a stereoscopic image is multiplexed using a side-by-side scheme according to an embodiment of the present invention.

In case of each image 4010, 4020 or 4030, a left image is located at the left side and a right image is located at the right side. In case of each image 4040, 4050 or 4060, a left image is located at the right side and a right image is located at the left side.

In the image 4010, a left image and a right image are normally oriented (normal orientation). In the image 4020, a left image located at the left side is mirrored. In the image 4030, a right image located at the right side is mirrored. In the image 4040, a right image and a left image are normally oriented. In the image 4050, a left image located at the left side is mirrored. In the image 4060, a right image located at the left side is mirrored.

The image inverting shown in FIG. 3 and the image mirroring shown in FIG. 4 may cause a difference in data compression rate. For example, it is assumed that neighbor pixel data of a reference pixel is differentially compressed in one screen image. One pair of stereoscopic images is basically a pair of images causing the 3D effect on the same screen image, such that there is a high probability that location information of one image may be similar to that of the other image. That is, in the normal oriented images 3010, 3040, 4010 and 4040, fully new image information appears at a connection part between a left image and a right image, and differential values may be greatly changed at the connection part. However, in the case of the inverted images 3020, 3030, 3050, and 3060, the bottom of the left image is connected to the bottom of the right image as shown in the images 3030 and 3050, or the top of the left image is connected to the top of the right image as shown in the images 3020 and 3060, such that an amount of coded data may be reduced in a connection part between the left image and the right image. In the case of the mirrored images 4020, 4030, 4050 and 4060, the right side of the left image is connected to the right side of the right image as shown in the images 4030 and 4050, or the left side of the left image is connected to the left side of the right image as shown in the images 4020 and 4060, the similarity of data successively appears at a connection part between the left image and the right image, so that the amount of coded data may be reduced.

In order to allow the reception system to receive and effectively process the 3D video stream or the 3D video data, it is necessary to transmit information about the aforementioned multiplexing format to the reception system. In addition, if the image is inverted or mirrored as described above, it is necessary to transmit information about the inverting or mirroring operation to the reception system. Hereinafter, the above-mentioned information may be defined as a table or a descriptor for convenience of description.

In the case of using the cable communication system shown in FIG. 1, the system information may be transmitted through an Out Of Band (OOB) according to one embodiment of the present invention. That is, stereo format information may be contained in system information (SI) transmitted through the OOB. In this case, the stereo format information may be contained in Virtual Channel Table (VCT) information transmitted through the OOB. In the cable communication system according to the present invention, the VCT may be transmitted as a Longform Virtual Channel Table (LVCT) or a Shortform Virtual Channel Table (SVCT). In accordance with another embodiment of the present invention, the stereo format information may be contained in system information transmitted through an InBand. In this case, the stereo format information may be contained in a Program Map Table (PMT) contained in an MPEG-2 TS transmitted via an InBand.

In addition, when the receiver of the cable broadcast system receives stereoformatted 3D video data, it is necessary for the receiver to identify that the received video data is 3D video data. If the receiver is unable to identify that the received video data is 3D video data, the conventional 2D receiver may process the 3D video data in the same manner as in 2D video data, resulting in unexpected problems. In addition, the 3D receiver may also process the 3D video data in the same manner as in 2D video data because it does not identity the 3D video data.

A method for identifying a 3D broadcast service using a cable communication system, a method for transmitting stereo format information, and a method for processing 3D video data using the stereo format information according to embodiments of the present invention will hereinafter be described with reference to the annexed drawings.

FIG. 5 shows a syntax structure of a Longform Virtual Channel Table (LVCT) for identifying whether a 3D broadcast service is provided according to an embodiment of the present invention.

Detailed descriptions of individual fields contained in the TVCT shown in FIG. 5 are as follows.

A table_id field includes an 8-bit unsigned integer number that indicates the type of table section being defined in the LVCT.

A section_syntax_indicator field is an one-bit field which shall be set to '1' for the longform_virtual_channel_table_section( ).

A private_indicator field is an 1-bit field shall be set to '1'.

A section_length field is a twelve bit field that specifies the number of bytes of the section, starting immediately following the section_length field, and including the CRC. The value in this field shall not exceed 4093.

A map_ID field includes a 16-bit identifier for this Longform Virtual Channel Table.

A version_number field is a 5 bit field which is the version number of the Long-form Virtual Channel Table.

A current_next_indicator field is an one-bit indicator, which when set to '1' indicates that the Long-form Virtual Channel Table sent is currently applicable. When the bit is set to '0', it indicates that the table sent is not yet applicable and shall be the next table to become valid.

A section_number field is an 8 bit field gives the number of this section. The section_number of the first section in the Long-form Virtual Channel Table shall be 0x00.

A last_section_number field is an 8 bit field specifies the number of the last section (that is, the section with the highest section_number) of the complete Long-form Virtual Channel Table.

A protocol_version field is an 8-bit unsigned integer field whose function is to allow, in the future, this table type to carry parameters that may be structured differently than those defined in the current protocol.

A num_channels_in_section field is an 8 bit field specifies the number of virtual channels in the L-VCT section. The number is limited by the section length.

A short_name field indicates the name of the virtual channel, represented as a sequence of one to seven 16-bit character codes coded in accordance with the Basic Multilingual Plane (BMP) of Unicode™, as specified in ISO 10646-1. If the name of the virtual channel is shorter than seven unicode characters, one or more instances of the null character value 0x0000 shall be used to pad the string to its fixed 14-byte length.

A major_channel_number field and a minor_channel_number field are two 10-bit fields represent either a two-part or a one-part virtual channel number associated with the virtual channel being defined in this iteration of the 'for' loop.

A modulation_mode field is an 8-bit unsigned integer number that indicates the modulation mode for the transmitted carrier associated with this virtual channel.

A carrier_frequency field includes a 32-bit unsigned integer that represents the carrier frequency associated with the analog or digital transmission associated with this virtual channel, in Hz.

A channel_TSID field is a 16-bit unsigned integer field, in the range 0x0000 to 0xFFFF, that represents the MPEG-2 Transport Stream ID associated with the Transport Stream carrying the MPEG-2 program referenced by this virtual channel.

A program_number field includes a 16-bit unsigned integer number that associates the virtual channel being defined here with the MPEG-2 Program Association and TS Program Map tables.

An access_controlled field is a 1-bit Boolean flag, when set, indicates that events associated with this virtual channel may be access controlled. When the flag is set to 0, event access is not restricted.

A hidden field is a 1-bit Boolean flag that indicates, when set, that the virtual channel is not accessed by the user by direct entry of the virtual channel number.

A path_select field is a 1-bit field that associates the virtual channel with a transmission path.

An out_of_band field is a Boolean flag that indicates, when set, that the virtual channel defined in this iteration of the 'for' loop is carried on the cable on the Extended Channel interface carrying the tables defined in this protocol. When clear, the virtual channel is carried within a standard tuned multiplex at that frequency.

A hide_guide field is a Boolean flag that indicates, when set to 0 for a hidden channel, that the virtual channel and its events may appear in EPG displays. Typical applications for hidden channels with the hide_guide bit set to 1 are test signals and services accessible through application-level pointers.

A service_type field 5010 is a 6-bit enumerated type field that identifies the type of service carried in this virtual channel. The cable broadcast receiver can identify whether the 3D broadcast service is provided through the service_type field 5010. In one embodiment, if the service_type field has the value of 0x12, this means that the corresponding virtual channel provides a 3D broadcast service (audio and stereo video streams).

A source_id field includes a 16-bit unsigned integer number that identifies the programming source associated with the virtual channel. In this context, a source is one specific source of video, text, data, or audio programming.

A descriptors_length field indicates Total length (in bytes) of the descriptors for this virtual channel that follows.

An additional_descriptors_length field indicates total length (in bytes) of the VCT descriptor list that follows.

A CRC_32 field is a 32-bit field that contains the CRC value that ensures a zero output from the registers in the decoder defined in Annex A of ISO/IEC 13818-1 MPEG-2 Systems after processing the entire Long-form Virtual Channel Table section.

A descriptor( ) field 5020 is a table section that may include, at its end, one or more structures of the form tag, length, data. A stereo format descriptor to be described later may be contained in the descriptor( ) field.

FIG. 6 shows a syntax structure of a Shortform Virtual Channel Table (SVCT) for identifying whether a 3D broadcast service is provided according to an embodiment of the present invention.

In the embodiment shown in FIG. 6, information about whether the 3D broadcast service is provided through the channel_type field of the virtual_channel table 6010. The virtual_channel table 6010 is contained in the virtual_channel( ) field 6060 of the VCM_structure table 6020. In addition, the VCM_structure table 6020 is contained in the VCM_structure( ) field 6070 of the shortform_virtual_channel_table_section table (SVCT) 6030.

Detailed descriptions of individual fields contained in the SVCT 6030 shown in FIG. 6 are as follows.

A table_ID field indicates a table_ID and the table_ID of the Short-form Virtual Channel Table shall be 0xC4.

A transmission_medium field is a 4-bit field shall be set to zero (0x0).

A table_subtype field is a 4-bit field that indicates the map type being delivered in this S-VCT section. Three map types are currently defined, the Virtual Channel Map (VCM), the Defined Channels Map (DCM), and the Inverse Channel Map (ICM).

A VCT_ID field is a 16-bit unsigned integer value, in the range 0x0000 to 0xFFFF, indicating the VCT to which the channel definitions in this table section apply.

Detailed descriptions of individual fields contained in the VCM_structure( ) table 6020 shown in FIG. 6 are as follows.

A descriptors_included field is a Boolean flag that indicates, when set, that one or more record-level descriptors are present in the table section.

A splice field is a Boolean flag that indicates, when set, that the Host should arm video processing hardware to execute the application of the data delivered in the VCM_structure( ) at the next MPEG-2 video splice point if the virtual channel changes described in the table section apply to a currently acquired channel, and the activation_time is reached.

An activation_time field is a 32-bit unsigned integer field providing the absolute second the virtual channel data carried in the table section will be valid, defined as the number of seconds since 0000 Hours UTC, Jan. 6, 1980.

A number_of_VC_records field includes an 8-bit unsigned integer number, in the range 1 to 255, that identifies the number of virtual_channel( ) records to follow in the table section. The number of records included is further limited by the allowed maximum table section length.

The virtual_channel( ) field 6060 defines the virtual_channel( ) record structure.

Detailed descriptions of individual fields contained in the virtual_channel( ) table 6010 shown in FIG. 6 are as follows.

A virtual_channel_number field is an unsigned 12-bit integer, in the range zero to 4095, reflecting the virtual channel whose definition is being provided by this virtual channel record, for the map identified by the VCT_ID field.

An application_virtual_channel field is a binary flag that, when set, indicates this virtual channel defines an access point represented by the application_ID.

A path_select field is a 1-bit field that associates the virtual channel with a transmission path.

A transport_type field is a 1-bit field identifying the type of transport carried on this carrier as either being an MPEG-2 transport (value zero), or not (value one).

A channel_type field is a 4-bit field defining the channel type. The cable broadcast receiver can identify whether the 3D broadcast service is provided through the channel_type field. In one embodiment of the present invention, if the field value of the channel_type field is set to 2, this means that the corresponding virtual channel provides the 3D broadcast service (audio and stereo video streams).

An application_ID field is a 16-bit unsigned integer number, in the range 0x0001 to 0xFFFF, that identifies the application associated with the virtual channel, on a system-wide basis.

A source_ID field is a 16-bit unsigned integer number, in the range 0x0000 to 0xFFFF, that identifies the programming source associated with the virtual channel, on a system-wide basis.

A program_number field is a 16-bit unsigned integer number that associates the virtual channel number being defined with services defined in the Program Association and TS Program Map Table sections.

A descriptors_count field is an 8-bit unsigned integer value, in the range 0 to 255, that defines the number of descriptors to follow.

A CDS_reference field is an unsigned 8-bit integer number, in the range 0 to 255, that identifies the frequency associated with this virtual channel.

A MMS_reference field is an 8-bit unsigned integer value, in the range 0 to 255, that references an entry in the Modulation Mode Subtable (MMS).

A video_standard field is a 4-bit field that indicates the video standard associated with this non-Standard virtual channel. Table 5.21 defines video standard.

A descriptor( ) field 6050 is a table section may include, at its end, one or more structures of the form tag, length, data. The number of descriptors present is determined indirectly by processing the section_length field. The stereo format descriptor to be described later may be contained in the descriptor( ) field 6050.

Figure 7:
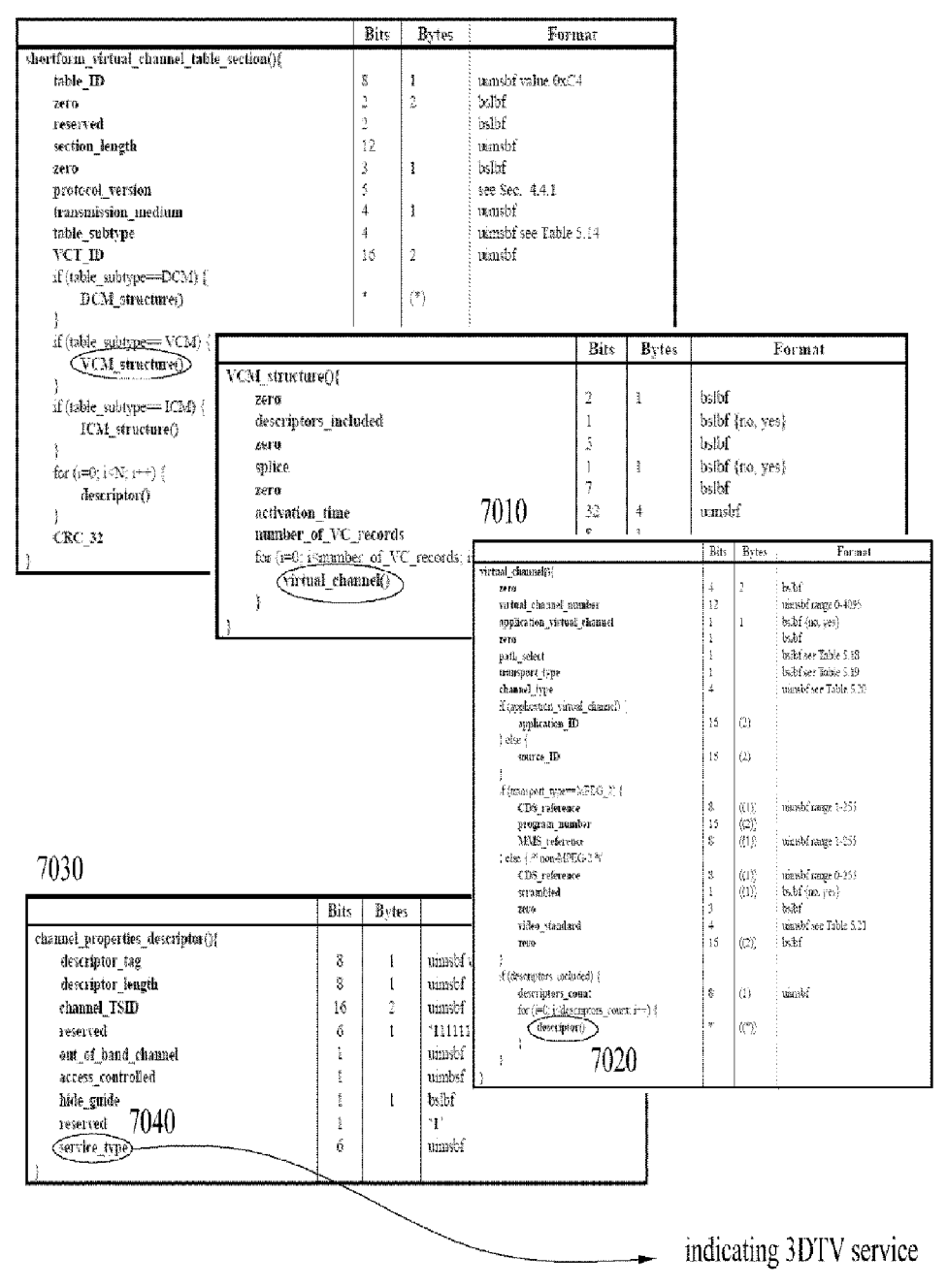

FIG. 7 shows a syntax structure of a Shortform Virtual Channel Table (SVCT) for identifying whether a 3D broadcast service is provided according to another embodiment of the present invention.

The embodiment shown in FIG. 7 includes information about whether the 3D broadcast service is provided in the service_type field 7040 of the channel_properties_descriptor( ) table 7030, whereas the embodiment shown in FIG. 6 includes information about whether the 3D broadcast service is provided in the channel_type field of the virtual_channel ( ) table. Detailed descriptions of the SVCT, the VCM_structure( ) table, and the virtual_channel( ) table are identical to those of FIG. 6, and detailed descriptions of individual fields contained in the channel_properties_descriptor( ) table 7030 are as follows.

A descriptor_tag field is an 8-bit unsigned integer number that identifies the descriptor as a channel_properties_descriptor( ).

A descriptor_length field is an 8-bit unsigned integer number that indicates the number of bytes to follow in the descriptor.

A channel_TSID field is a 16-bit unsigned integer field in the range 0x0000 to 0xFFFF that represents the MPEG-2 Transport Stream ID associated with the Transport Stream carrying the MPEG-2 program referenced by this virtual channel.

An out_of_band field is a Boolean flag that indicates, when set, that the virtual channel associated with this descriptor is carried on the cable on the Extended Channel interface carrying the tables defined in this protocol. When clear, the virtual channel is carried within a standard tuned multiplex at that frequency.

An access_controlled field is a Boolean flag that indicates, when set, that events associated with this virtual channel may be access controlled. When the flag is zero, event access is not restricted.

A hide_guide field is a Boolean flag that indicates, when set to 0 for a channel of channel_type hidden, that the virtual channel and its events may appear in EPG displays.

A service_type field is a 6-bit enumerated type field that identifies the type of service carried in this virtual channel. The cable broadcast receiver is able to identify whether the 3D broadcast service is provided through the service_type field. For example, if the field value of the service_type field is set to 0x1, this means that the corresponding virtual channel provides the 3D broadcast service (audio and stereo videostreams).

Next, when the receiver identifies the 3D broadcast service and receives the 3D video data, stereo format information for processing 3D video data in the form of a display format capable of being displayed by a receiver, and a method for signaling the stereo format information will hereinafter be described with reference to the annexed drawings.

First, the stereo format information may be contained in the LVCT or SVCT, such that it can be transmitted through the LVCT or SVCT. In the case of the LVCT according to the aforementioned embodiment, the stereo format information may be contained in the descriptor( ) field 5020 of FIG. 5. In the case of the SVCT according to the aforementioned embodiment, the stereo format information may be contained in the descriptor( ) field 6050 of FIG. 6 or the descriptor( ) field 7020 of FIG. 7, and transmitted.

FIG. 8 shows a syntax structure of a Program Map Table (PMT) including stereo format information according to an embodiment of the present invention.

The stereo format information may be contained in the descriptor( ) field 8010 contained in the PMT (i.e., TS_program_map_section( ) table) shown in FIG. 8, and detailed descriptions of individual fields contained in the PMT are as follows.

A table_id field is an 8 bit field, which in the case of a TS_program_map_section shall be always set to 0x02.

A section_syntax_indicator fields is a 1 bit field which shall be set to '1'.

A section_length field is a 12 bit field, the first two bits of which shall be '00'. It specifies the number of bytes of the section starting immediately following the section_length field, and including the CRC.

A program_number field is a 16 bit field, which specifies the program to which the program_map_PID is applicable.

A version_number field is 5 bit field, which is the version number of the TS_program_map_section.

A current_next_indicator field is a 1 bit field, which when set to '1' indicates that the TS_program_map_section sent is currently applicable. When the bit is set to '0', it indicates that the TS_program_map_section sent is not yet applicable and shall be the next TS_program_map_section to become valid.

A section_number field includes the value of this 8 bit field which shall be always 0x00.

A last_section_number field includes the value of this 8 bit field which shall be always 0x00.

A PCR_PID field is a 13 bit field indicating the PID of the Transport Stream packets which shall contain the PCR fields valid for the program specified by program_number. If no PCR is associated with a program definition for private streams then this field shall take the value of 0x1FFF.

A program_info_length field is a 12 bit field, the first two bits of which shall be '00'.

It specifies the number of bytes of the descriptors immediately following the program_info_length field.

A stream_type field is an 8 bit field specifying the type of elementary stream or payload carried within the packets with the PID whose value is specified by the elementary_PID.

An elementary_PID field is a 13 bit field specifying the PID of the Transport Stream packets which carry the associated elementary stream or payload.

An ES_info_length field is a 12 bit field, the first two bits of which shall be '00'. It specifies the number of bytes of the descriptors of the associated elementary stream immediately following the ES_info_length field.

A CRC_32 field is a 32 bit field that contains the CRC value that gives a zero output of the registers in the decoder defined in Annex B after processing the entire Transport Stream program map section.

FIG. 9 shows a syntax structure of a stereo format descriptor according to an embodiment of the present invention.

Referring to FIG. 9, the stereo format descriptor is identical to a stereo format descriptor (stereo_format_descriptor ( )) contained in the VCT. In accordance with embodiments, the stereo format descriptor (stereo_format_descriptor( )) may be contained in any one of the descriptor field 5020 of the LVCT shown in FIG. 5, the descriptor field 6050 of the SVCT shown in FIG. 6, or the descriptor field 7020 of the SVCT shown in FIG. 7. Detailed descriptions of individual fields contained in the stereo format descriptor (stereo_format_descriptor( )) are as follows.

The descriptor_tag field is used as a user private descriptor, and may be set to any one of 0xC0~0xFF.

The stereo_composition_type field may indicate a multiplexing format of the stereoscopic image. The reception system parses the stereo_composition_type field, such that it can determine which format among several formats (i.e., a side-by-side format, a top-bottom format, an interlaced format, a frame sequential format, a checkerboard format, and an anaglyph format) was used for transmission of the corresponding 3D image. That is, the receiver can recognize information about the composition or multiplexing format of received 3D video data through the stereo_composition_type field.

When multiplexing the stereoscopic image, the LR_first_flag field may indicate whether the top leftmost pixel is a left image or a right image. In accordance with one embodiment of the present invention, if the left image is located at the top left side, the LR_first_flag field may be assigned a value of 0. If the right image is located at the top left side, the LR_first_flag field may be assigned a value of 1. For example, the reception system can recognize that the 3D image received through the stereo_composition_type field is received using the side-by-side multiplexing format. If the LR_first_flag field is set to the value of 0, it can be recognized that a left-half image of one frame corresponds to a left image and a right-half image corresponds to a right image.

The spatial_flipping_flag field indicates the scanning direction of a left image or a right image. As previously stated in FIGS. 3 and 4, the left image or the right image may be scanned in a vertical or horizontal direction according to the coding rate, such that the resultant image can be configured. In the case of the side-by-side format, the left image may be mirrored in a horizontal direction with respect to the right image. In the case of the top-bottom format, the left image may be inverted in a vertical direction with respect to the right image. In accordance with one embodiment of the present invention, if the spatial_flipping_flag field is set to the value of 0, this means that images are arranged in a normal scanning direction. If the spatial_flipping_flag field is set to the value of 1, this means that one of the images are scanned in a reverse direction.

When the spatial_flipping_flag field is set to 1, the image0_flipped_flag field indicates which image is scanned in the reverse direction. For example, if the image0_flipped_flag field is set to 0, this means that the image (image0) is scanned in the reverse direction (i.e., flipping). If the image0_flipped_flag field is set to 1, this means that another image (image1) is scanned in the reverse direction (i.e., flipping). The image0 and the image1 are decided by the aforementioned LR_first_flag field. If the LR_first_flag field is set to 0, this means that the left image is 'image0' and the right image is ' image1'. That is, the image located at the top leftmost pixel is identical to 'image0'. In the case of the scanning direction, as described in FIGS. 3 and 4, the scanning direction of the side-by-side format is a horizontally revered direction, and the scanning direction of the top-bottom format is a vertically reversed direction. In accordance with the implementation example of the reception system, the image0_flipped_flag field is disregarded in the remaining stereo formats other than the top-bottom format and the side-by-side format. That is, the reception system parses the stereo_composition_type field so as to determine the multiplexing format. If the multiplexing format is the top-bottom format or the side-by-side format, the reception system determines the scanning direction by parsing the spatial_flipping_flag field and the image0_flipping_flag field. In the remaining multiplexing formats other than the top-bottom and side-by-side formats, the reception system may disregard the spatial_flipping_flag field and the image0_flipping_flag field. In case of another system according to another embodiment of the present invention, an image may also be arranged in a reverse direction in the remaining multiplexing formats other than the top-bottom and side-by-side formats. In this case, the scanning direction can be determined using the spatial_flipping_flag field and the image0_flipping_flag field.

When the transmission system samples a full-resolution image into a half-resolution image, the quincunx_filtering_flag field may indicate sampling scheme which is used to sample the full resolution image. This information may also be called sampling information or a sampling flag field. In one embodiment of the present invention, the transmission system may perform ½ down-sampling (i.e., ½ decimation) of data in a horizontal or vertical direction, and may diagonally perform ½ down-sampling (quincunx sampling or quincunx filtering) using the quincunx filter in the same manner as the checkerboard format. For example, if the quincunx_filtering_flag field has the value of 0, this means that the transmission system has performed the ½ down-sampling in the horizontal or vertical direction. If the quincunx_filtering_flag field has the value of 1, this means that the transmission system has performed the down-sampling using the quincunx filter. If the quincunx_filtering_flag has the value of 1, the reception system can recover the image using the reverse processing of the quincunx filtering.

For example, provided that individual fields of the stereo format descriptor are set as follows: stereo_composition_type='side-by-side', LR_first_flag='1', spatial_flipping_flag='1', and image0_flipped_flag='1', video data is multiplexed in the side-by-side format, such that it can be recognized that the right image is located at the left side and the left image is mirrored. Therefore, prior to displaying data, the reception system scans in a reverse direction and constructs an output image according to the reversely scanned result. If the sampling_flag field is set to 0 (sampling_flag=0), this means that the quincunx sampling is performed. The reception system performs quincunx reverse-sampling so as to perform an appropriate formatting operation, and constructs an output image.

If the user desires to view an image in a 2D mode or a display device does not support a 3D display, the broadcast receiver may display an image of a predetermined view prescribed in the LR_first_flag field as a default image. In this case, the display device may not display images of other views and bypass the other-view images. In this case, the broadcast receiver may scan the image in a reverse direction by referring to the spatial_flipping_flag field and the image0_flipped_flag field. Otherwise, the LR output field or flag (e.g., LR_output_flag) may be added. If the LR_output_flag field has the value of 1, the broadcast receiver may output the left image in the form of a 2D image. If the LR_output_flag field has the value of 0, the broadcast receiver may output the right image in the form of a 2D image.

FIG. 10 shows a syntax structure of a stereo format descriptor according to another embodiment of the present invention.

Referring to FIG. 10, the stereo format descriptor (stereo_format_descriptor( )) field is also contained in the PMT of FIG. 8, such that detailed descriptions of the same fields contained in the stereo format descriptor (stereo_format_descriptor( )) field shown in FIG. 9 will herein be omitted for convenience of description.

The stereo_format_descriptor field shown in FIG. 10 may include the service_type field. The service_type field may indicate phase information of the 3D service. In one embodiment, if the field value of the service_type field is set to 0x40, the service_type field may indicate 'phase 1 3D broadcast service'. If the field value of the service_type field is set to 0x41, the service_type field may indicate 'phase 2 3D broadcast service'. The phase information may be identical to version information about the 3D broadcast service. For example, assuming that the 3D broadcast service uses the conventional hardware (e.g., codec, etc.) without any change, the phase information may be defined as 'phase 1'. If the compatibility between the 3D broadcast service and the conventional set-top box is not guaranteed, the phase information may be defined as 'phase 2'. Otherwise, when using the legacy HD frame structure or hardware in the same manner as in the top-bottom format or the side-by-side format (including some firmware upgrade information), the phase information may also be called 'phase 1'.

In accordance with the embodiments, the stereo format descriptor (stereo_format_descriptor) may not include the service_type field as shown in FIG. 10, and may be contained in the PMT as shown in FIG. 9.

FIG. 11 shows 3D video data in response to a field value contained in a stereo format descriptor according to an embodiment of the present invention.

The embodiment shown in FIG. 11 may be changed according to a value assigned to the corresponding field. Detailed descriptions of individual fields and the 3D video data format depending upon each field value have already been described in the aforementioned embodiments, such that detailed descriptions thereof will herein be omitted in detail.

A method for allowing the receiver to process/output 3D video data using the aforementioned stereo format information (or the stereo format descriptor) will hereinafter be described in detail.

First, a method for allowing the receiver to process 3D video data through the VCT (LVCT or SVCT) is as follows.

The receiver parses the SI information received through the OOB, and extracts the VCT contained in the SI information. In accordance with the cable broadcast system, the receiver may receive the LVCT or the SVCT as the VCT, and process the received LVCT or SVCT. In one embodiment, the receiver may recognize whether the corresponding virtual channel provides the 3D broadcast service through the service_type field contained in the LVCT. In another embodiment, the receiver may recognize whether the corresponding virtual channel provides the 3D broadcast service through the service_type field of the channel_properties_descriptor field contained in the virtual_channel_record field of the SVCT. In still another embodiment, the receiver may recognize whether the corresponding virtual channel provides the 3D broadcast service through the channel_type field contained in the virtual_channel table of the SVCT.

In the case where the corresponding virtual channel provides the 3D broadcast service, the receiver parses the stereo format information contained in the SVCT or LVCT, such that it can recognize stereo configuration information of 3D video data, left/right arrangement information, left/right reverse-scanning information, sampling scheme information, etc. The receiver recognizes PIDs of the audio and video elements of the corresponding channel through the InBand received PMT using the program_number field contained in the VCT, such that it can receive and extract the corresponding 3D broadcast data.

The receiver performs formatting of 3D video data through the parsed stereo format information, and outputs the resultant 3D video data. In this case, a variety of video data rendering operations may be carried out in consideration of not only the received 3D video data format but also a 3D video format supported by the display device, and detailed descriptions thereof will hereinafter be described in detail. In accordance with the implementation embodiment of the receiver, the receiver may format the 3D video data and output the formatted 3D video data, or may output the 3D video data along with the stereo format information. Otherwise, the 3D video data may also be formatted by the display device. In this case, not only 3D video data but also information obtained from the stereo format descriptor may be transmitted through the interface (e.g., HDMI) between the source device (i.e., receiver) and the sink device (i.e., display device).

Next, the following description relates to an embodiment in which 3D video data is received through Video on Demand (VoD).

In this case, a user pre-identifies whether a channel or content provides the 3D video service, and requests the resultant content, such that a procedure for identifying whether the aforementioned 3D video service is provided will herein be omitted.

The receiver uses a VoD protocol at a specific location between the host device and the content server (i.e., headend), such that it can obtain a specific channel through which the 3D content will be received. The receiver receives the 3D content through the corresponding channel. During the reception of the 3D content, the receiver can recognize stereo configuration information of the 3D video data, left/right arrangement information, left/right reverse-scanning information, sampling scheme information, etc., wherein the 3D video data is contained in the 3D content that is received using the stereo format information contained in the PMT.

The receiver controls the output of the 3D video data using information obtained from the stereo format descriptor (stereo_format_descriptor). As described above, provided that the receiver includes a display device, this receiver processes and outputs the 3D video data using the video formatter. If the display device is separately configured, 3D video data and stereo format information are transmitted to the display device, and the display device can process/output the 3D video data.

In another embodiment, the receiver may perform resizing and formatting so as to output video data of a spatially multiplexed format (side-by-side, top-bottom, line interlaced, or the like) according to display capacity/type information through the use of the output formatter, or may perform resizing and formatting so as to output video data of a temporally multiplexed format (frame sequential, field sequential, or the like) according to display capacity/type information through the use of the output formatter. In addition, in order to achieve coincidence between frame rates supported by the display device, the broadcast receiver may also perform frame rate conversion.

In association with the content for providing the 3D broadcast service, the 2D content may be separately provided, or only the 3D content may be transmitted as necessary. The receiver capable of displaying only the 2D video data may extract 2D data from the 3D video data. In other words, the stereoscopic image format includes a left-view image and a right-view image, such that any one of the left-view image and the right-view image may be selected as a 2D image and the resultant 2D image may be output. In this case, information about the viewpoint information for the 2D image may be contained in either the identifier or the stereo format descriptor for indicating whether the aforementioned 3D video service is provided. In one embodiment, the LR output field or flag (e.g., LR_output_flag) may be added. If the corresponding field (i.e., LR_output_flag field) has the value of 0, the left image may be displayed in the form of a 2D image. If the LR_output_flag field has the value of 1, the right image may be displayed in the form of a 2D image.

The video formatting of the receiver will hereinafter be described in detail. The receiver may perform processing (or rendering) of the 3D video data through either the video formatter for processing video data or the output formatter.

Figure 12:
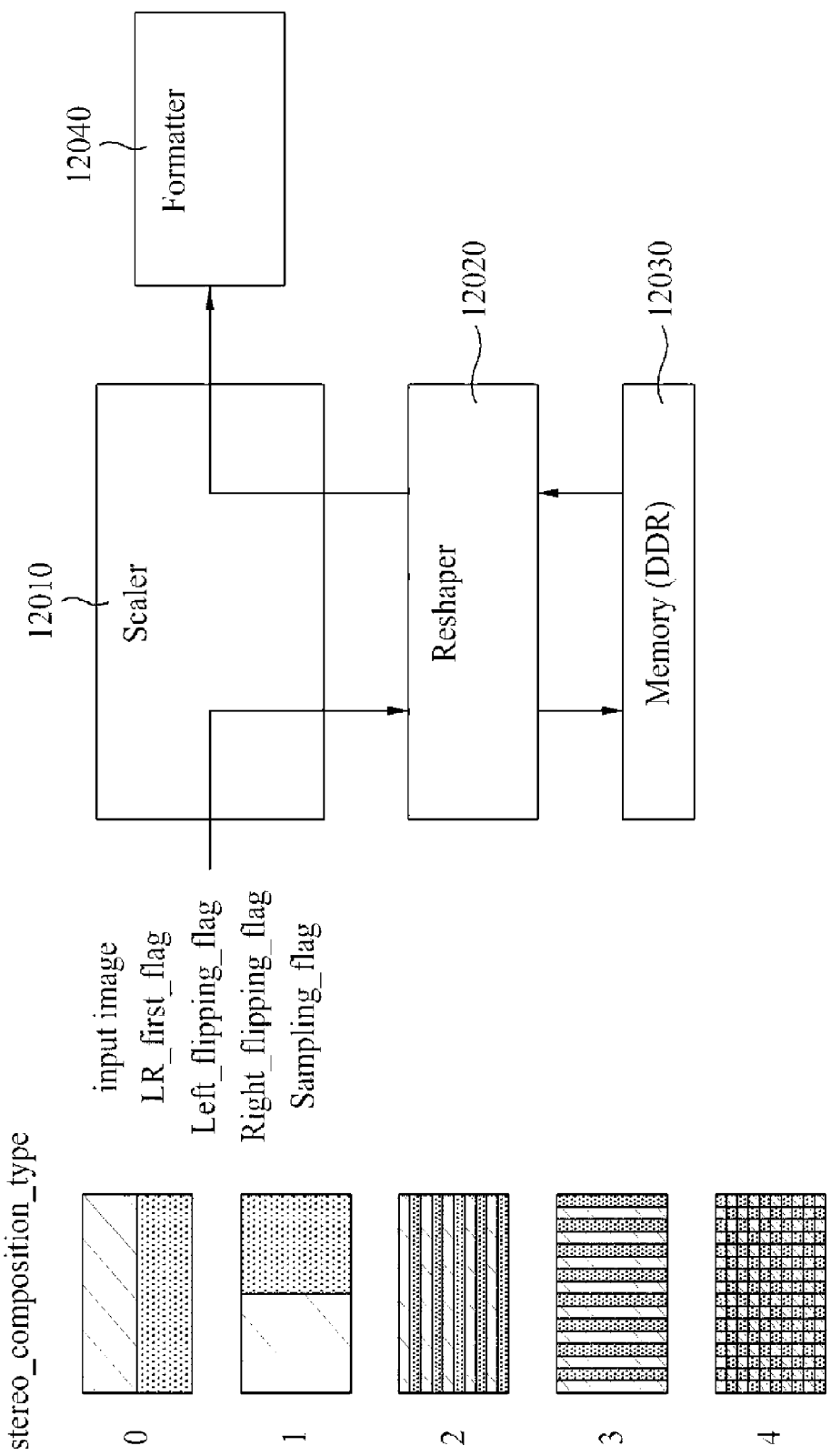
FIG. 12 is a block diagram illustrating a receiver for displaying received 3D video data in the form of a 2D image using stereo format information according to an embodiment of the present invention.

FIG. 12 is a block diagram illustrating a receiver for displaying received 3D video data in the form of a 2D image using stereo format information according to an embodiment of the present invention.

As can be seen from the left side of FIG. 12, the receiver can recognize the multiplexing format of 3D video data according to a field value of the stereo_composition_type field.

In other words, the broadcast receiver parses the system information. If the stereo_composition_type field is set to the value of 0, the broadcast receiver can identify the top-bottom format. If the stereo_composition_type field is set to the value of 1, the broadcast receiver can identify the side-by-side format. If the stereo_composition_type field is set to the value of 2, the broadcast receiver can identify the horizontally interlaced format. If the stereo_composition_type field is set to the value of 3, the broadcast receiver can identify the vertically interlaced format. If the stereo_composition_type field is set to the value of 4, the broadcast receiver can identify the checkerboard format.

A conceptual diagram of the output formatter of the broadcast receiver is illustrated at the right side of FIG. 12. In one embodiment, the output formatter of the broadcast receiver may include a scaler 12010, a reshaper 12020, a memory 12030, and a formatter 12040.

The scaler 12010 performs resizing and interpolation of the received image. For example, the scaler 12010 may perform resizing and quincunx reverse-sampling of the received image according to the received image format and the output image format. During the resizing, the received image may be resized with various rates (e.g., 1/2 resizing, doubling (2/1 resizing)) according to the resolution and the image size. The reshaper 12020 extracts the left/right images from the received image and stores the extracted left/right images in the memory 12030, or extracts the read image from the memory 12030. If a map of one image stored in the memory 12030 is different from that of an output image, the reshaper 12020 reads the image stored in the memory and maps the read image to the output image. The memory 12030 stores the received image, or buffers the received image and outputs the buffered image result. The formatter 12040 performs conversion of an image format according to the format of an image to be displayed. For example, the formatter 12040 may convert the top-bottom format image into the interlaced format. In the following description, it is assumed that the 2D image to be output is set to the left image for convenience of description, however, it should be noted that the left or right image is displayed in the form of a 2D image according to the corresponding field value as previously stated above.

Figure 13:
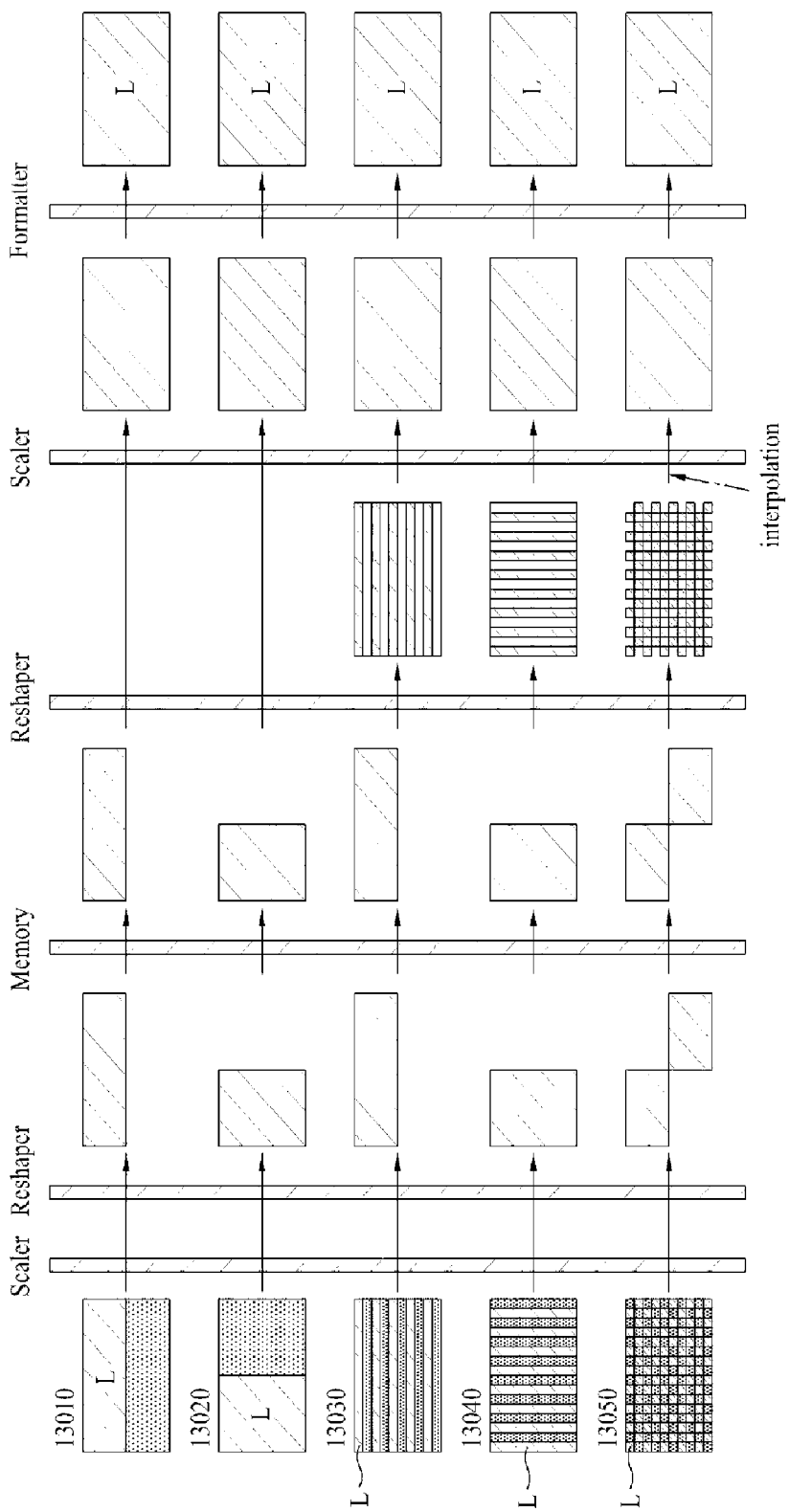
FIG. 13 is a conceptual diagram illustrating a method for displaying received 3D video data in the form of a 2D image by processing the 3D video data using stereo format information according to an embodiment of the present invention.

FIG. 13 is a conceptual diagram illustrating a method for displaying received 3D video data in the form of a 2D image by processing the 3D video data using stereo format information according to an embodiment of the present invention.

FIG. 13 shows operations of the receiver when individual fields of the stereo format descriptor are set to as follows: LR_first_flag=0, spatial_flipping_flag=0, and quincunx_filtering_flag=1. According to values given to the individual fields, if the LR_first_flag field is set to the value of 0, this means that the top left image is a left image. If the spatial_flipping_flag field is set to the value of 0, this means that it is not necessary to perform reverse scanning of the image. If the quincunx_filtering_flag field is set to the value of 0, this means that 1/2 resizing (e.g., decimation) is carried out in a horizontal or vertical direction.

When receiving the top-bottom format image 13010 (stereo_composition_type=0), the reshaper extracts the top left image to be displayed, stores the extracted image in the memory, reads the stored image from the memory, and outputs the read image. In case of the top-bottom format image, a map of the output image is identical to that of an image stored in the memory, such that there is no need to perform additional mapping as necessary. The scaler performs interpolation or vertical 2/1 resizing of the top image, such that it outputs a full-screen left image. When displaying a 2D image, the broadcast receiver need not convert the multiplexing format of the image, such that the formatter may bypass the image received from the scaler.

When receiving the side-by-side format image 13020 (stereo_composition_type=1), the reshaper extracts the top left image to be displayed, stores the extracted image in the memory, reads the stored image from the memory, and outputs the read image. In case of the side-by-side format image, a map of the output image is identical to that of the image stored in the memory, such that there is no need to perform additional mapping as necessary. The scaler performs interpolating or horizontal 2/1 resizing of the left image, such that it outputs a full-screen left image. When displaying a 2D image, the broadcast receiver need not convert the multiplexing format of the image, such that the formatter may bypass the image received from the scaler.

Upon receiving the horizontally interlaced format image 13030 (stereo_composition_type=2), the reshaper extracts a left image to be displayed, stores the extracted left image in the memory, reads the stored image from the memory, and outputs the read image. In the case of the horizontally interlaced format image, although an output image is displayed in the interlaced format, the output image may be stored in the memory without arranging empty pixels among interlaced pixels so as to increase the storage efficiency. In this case, when the reshaper reads an image from the memory and outputs the read image, the reshaper performs mapping to the interlaced image, such that it outputs the mapped result to the scaler. The scaler performs interpolating or ⅔ resizing of the interlaced format image, such that it outputs a full-screen image.

Upon receiving the vertically interlaced format image 13040 (stereo_composition_type=3), the reshaper extracts a left image to be displayed, stores the extracted left image in the memory, reads the stored image from the memory, and outputs the read image. In the case of the vertically interlaced format image, although an output image is displayed in the interlaced format, the output image may be stored in the memory without arranging empty pixels among interlaced pixels so as to increase the storage efficiency. In this case, when the reshaper reads an image from the memory and outputs the read image, the reshaper performs mapping to the interlaced image, such that it outputs the mapped result to the scaler. The scaler performs interpolating or ⅔ resizing of the interlaced format image, such that it outputs a full-screen image.

Upon receiving the checkerboard format image 13050 (stereo_composition_type=4), the reshaper extracts a left image to be displayed, stores the extracted left image in the memory, reads the stored image from the memory, and outputs the read image. In the case of the checkerboard format image, although an output image is displayed in the interlaced format, the output image may be stored in the memory without arranging empty pixels among interlaced pixels so as to increase the storage efficiency. In this case, when the reshaper reads an image from the memory and outputs the read image, the reshaper performs mapping to the interlaced image, such that it outputs the mapped result to the scaler. The scaler performs interpolating or ⅔ resizing of the interlaced format image, such that it outputs a full-screen image.

Figure 14:
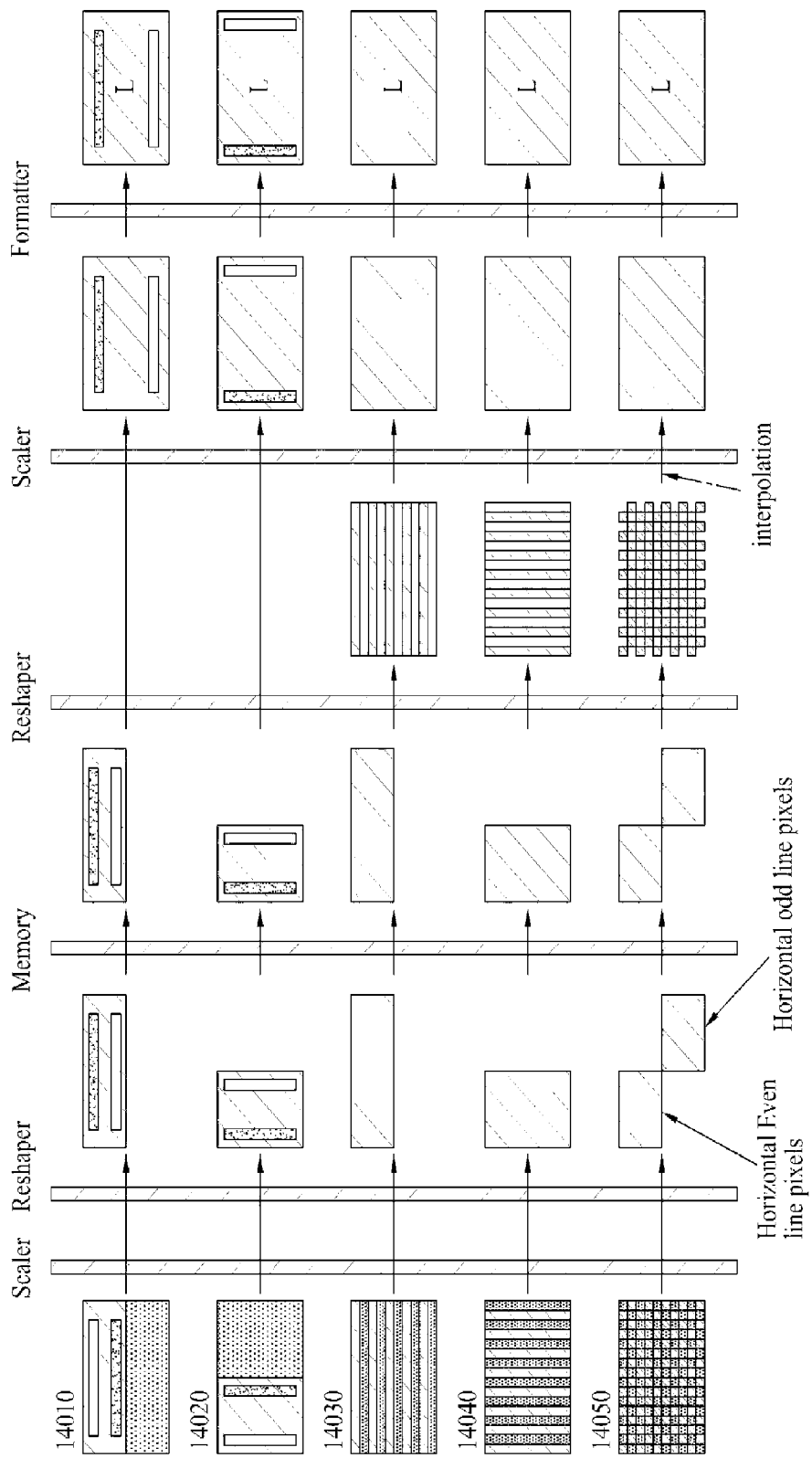
FIG. 14 is a conceptual diagram illustrating a method for displaying received 3D video data in the form of a 2D image by processing the 3D video data using stereo format information according to another embodiment of the present invention.

FIG. 14 is a conceptual diagram illustrating a method for displaying received 3D video data in the form of a 2D image by processing the 3D video data using stereo format information according to another embodiment of the present invention.

FIG. 14 shows operations of the receiver when individual fields of the stereo format descriptor are set as follows: LR_first_flag=0, spatial_flipping_flag=1, image0_flipped_flag=0, and quincunx_filtering_flag=0. According to values given to the individual fields, if the LR_first_flag field is set to the value of 0, this means that the top left image is a left image. If the spatial_flipping_flag field is set to the value of 1, this means that it is necessary to perform reverse scanning of the image. If the image0_flipping_flag field is set to the value of 0, this means that it is necessary to perform reverse scanning of the left image (i.e., image0). If the quincunx_filtering_flag field is set to the value of 0, this means that no quincunx sampling is performed and ½ resizing (e.g., decimation) is carried out in a horizontal or vertical direction.

When receiving the top-bottom format image 14010 (stereo_composition_type=0), the reshaper extracts the top left image to be displayed, stores the extracted image in the memory, reads the stored image from the memory, and outputs the read image. In this case, the Left_flipping_flag field is set to the value of 1, such that a left image is scanned in a reverse direction while the left image is read and stored. The scaler performs vertical ⅔ resizing of the top image, such that it outputs a full-screen left image. When displaying a 2D image, the broadcast receiver need not convert the multiplexing format of the image, such that the formatter may bypass the image received from the scaler.

When receiving the side-by-side format image 14020 (stereo_composition_type=1), the reshaper extracts the top left image to be displayed, stores the extracted image in the memory, reads the stored image from the memory, and outputs the read image. In this case, the Left_flipping_flag field is set to the value of 1, such that a left image is scanned in a reverse direction while the left image is read and stored. The scaler performs horizontal ⅔ resizing of the left image, such that it outputs a full-screen left image.

In FIG. 14, in the case of the horizontally interlaced format 14030, the vertically interlaced format 14040, the checkerboard format 14050, the broadcast receiver may disregard the Left_flipping_flag field and the Right_flipping_flag field and perform data processing according to system implementation examples. Consequently, video data processing is conducted in the same manner as in the horizontally interlaced format 13030, the vertically interlaced format 13040, and the checkerboard format 13050 shown in FIG. 13, and as such a detailed description thereof will herein be omitted for convenience of description. However, according to system implementation embodiments, it is determined whether to scan the image in a reverse direction using the Left_flipping_flag field and the Right_flipping_flag field, differently from the multiplexing format.

Figure 15:
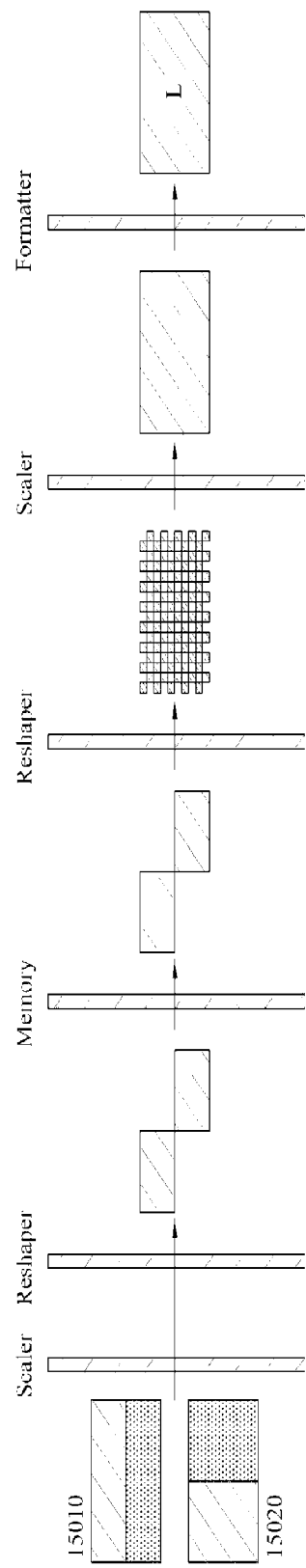
FIG. 15 is a conceptual diagram illustrating a method for displaying received 3D video data in the form of a 2D image by processing the 3D video data using stereo format information according to another embodiment of the present invention.

FIG. 15 is a conceptual diagram illustrating a method for displaying received 3D video data in the form of a 2D image by processing the 3D video data using stereo format information according to another embodiment of the present invention.

FIG. 15 shows operations of the receiver when individual fields of the stereo format descriptor are set as follows: LR_first_flag=0, spatial_flipping_flag=0, and quincunx_filtering_flag=1.

According to values given to the individual fields, if the LR_first_flag field is set to the value of 0, this means that the top left image is a left image. If the spatial_flipping_flag field is set to the value of 0, this means that it is not necessary to perform reverse scanning of the image. If the quincunx_filtering_flag field is set to the value of 1, this means that the quincunx sampling is performed.

The receiver receives the top-bottom format image 15010 or the side-by-side format image 15020, and the reshaper reads the left image and stores it in the memory. In this case, if the reshaper reads the image stored in the memory, the read image is not identical to the vertical ½ resized image or the horizontal ½ resized image, but is configured in the checkerboard format. Therefore, in the case where the reshaper reads the left image from the memory, it performs mapping of the quincunx-sampled checkerboard format image and outputs the mapped result. The scaler receives the checkerboard format image, and performs quincunx reverse-sampling, such that it can output a full-screen left image.

Figure 16:
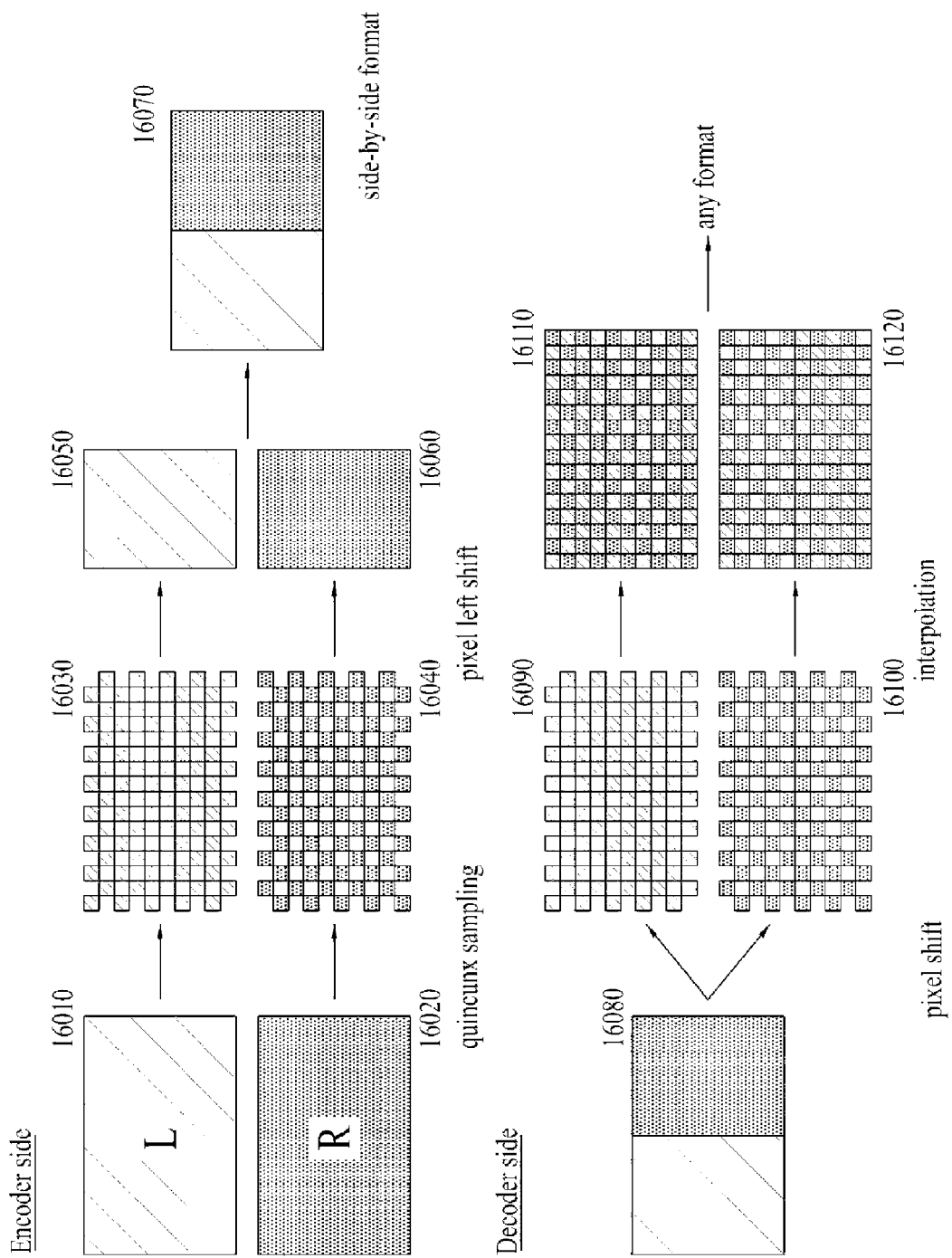
FIG. 16 is a conceptual diagram illustrating a method for processing 3D video data using quincunx sampling according to an embodiment of the present invention.

FIG. 16 is a conceptual diagram illustrating a method for processing 3D video data using quincunx sampling according to an embodiment of the present invention.

In FIG. 16, the upper drawing illustrates the image processing executed at an encoder side of the transmitter, and the lower drawing illustrates the other image processing executed at a decoder side of the receiver.

First, the broadcast transmitter performs quincunx sampling on the full-screen left image 16010 and the full-screen right image 16020 so as to transmit the side-by-side format image, and obtains the sampled left image 16030 and the sampled right image 16040. The broadcast transmitter performs pixel-shifting on each of the sampled left image 16030 and the sampled right image 16040, such that it acquires the ½-resized left image 16050 and the ½-resized right image 16060. The resized images 16050 and 16060 are integrated into one screen image, such that the broadcast transmitter obtains the side-by-side format image 16070 to be transmitted. An example of the side-by-side format is illustrated in FIG. 16. Although the broadcast transmitter performs horizontal pixel-shifting on the quincunx-sampled image so as to obtain the side-by-side format image, it may perform vertical pixel-shifting on the quincunx-sampled image so as to obtain the top-bottom format image as necessary.

After that, the broadcast receiver receives the top-bottom format image 16080. Since the sampling_flag field of the 3D image format information is set to the value of 0, it can be recognized that quincunx sampling has been carried out. Therefore, when the broadcast receiver scans the top-bottom format image 16080 and performs pixel sampling of the scanned image, it outputs the images 16090 and 16100, each of which is configured in the form of a quincunx sampled image. During the interpolation, the broadcast receiver performs quincunx reverse-sampling, such that it can obtain a full-screen left image 16110 and a full-screen right image.

Figure 17:
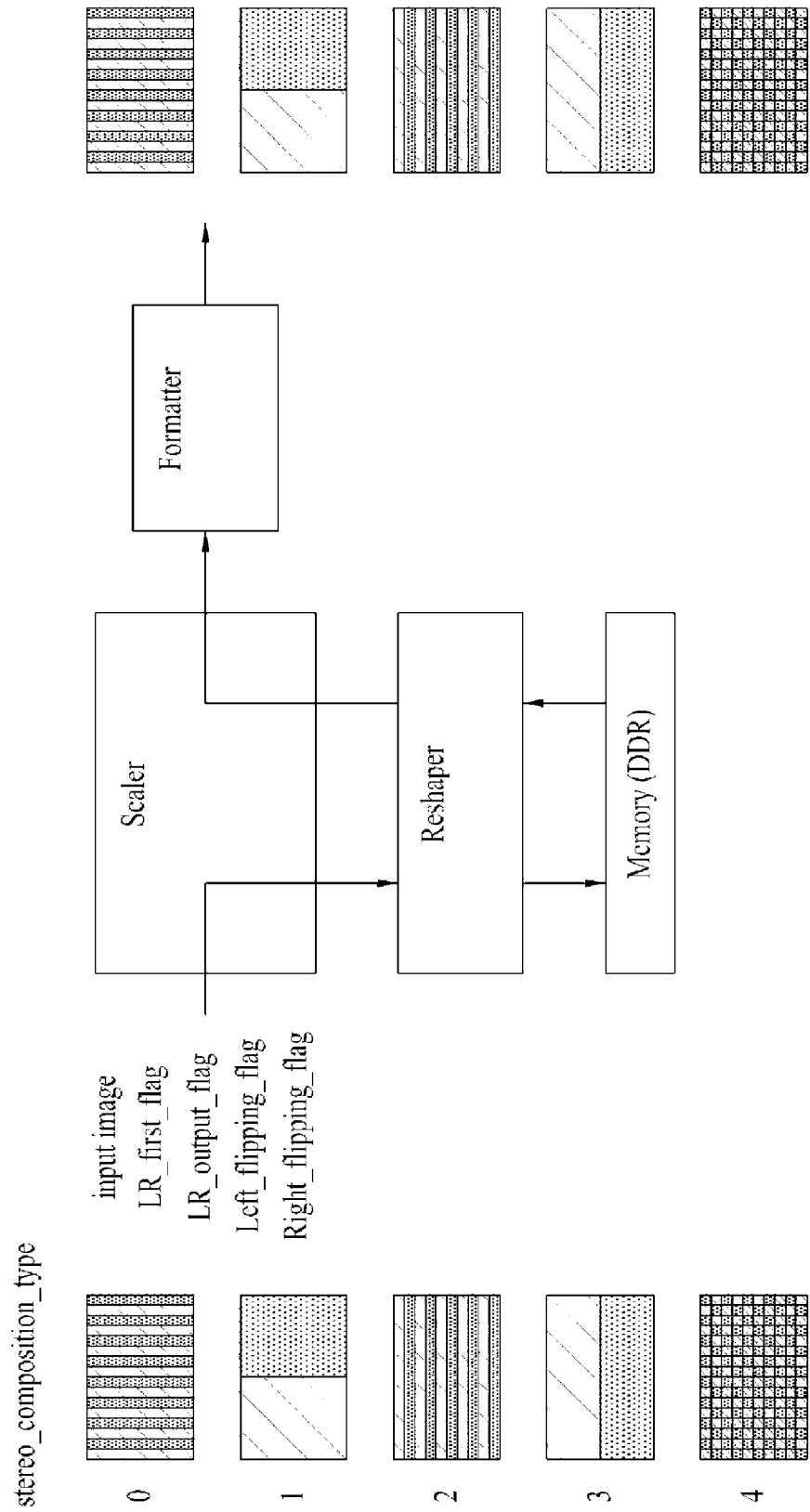
FIG. 17 is a block diagram illustrating a broadcast receiver that converts a multiplexing format of a received image using 3D image format information and then outputs the converted result according to an embodiment of the present invention.
Figure 18:
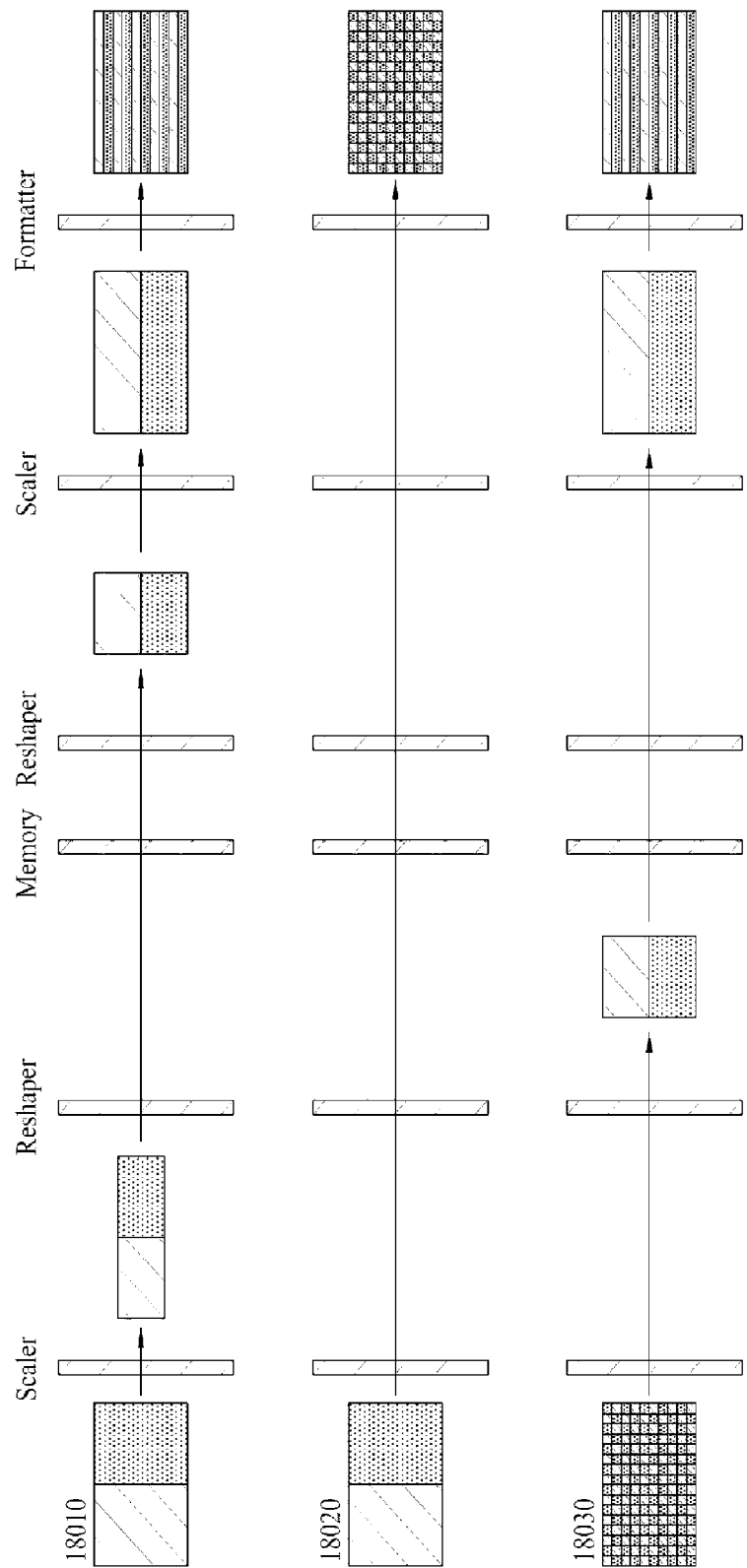
FIG. 18 shows a video data processing method for use in a broadcast receiver that converts a multiplexing format of a received image using 3D image format information and then outputs the converted result according to an embodiment of the present invention.

FIGS. 17 and 18 illustrate methods for converting a multiplexing format of a received image into another multiplexing format using 3D image format information.

FIG. 17 is a block diagram illustrating a broadcast receiver that converts a multiplexing format of a received image using 3D image format information and then outputs the converted result according to an embodiment of the present invention.

In FIG. 17, the same parts as those of FIG. 12 will herein be omitted for convenience of description and better understanding of the present invention. In the embodiment shown in FIG. 12, a 2D image (i.e., a frame composed of a single viewpoint image) is displayed and thus the formatter displays the received image without any change. In contrast, in the embodiment shown in FIG. 17, the formatter processes the received 3D video data, and converts the processed video data into an image output format prescribed in the display device or the broadcast receiver.

FIG. 18 shows a video data processing method for use in a broadcast receiver that converts a multiplexing format of a received image using 3D image format information and then outputs the converted result according to an embodiment of the present invention.

First of all, the following embodiment relates to an exemplary case in which the multiplexing format of the received 3D image corresponds to the side-by-side format and the output format is the horizontally interlaced format. Individual fields of the 3D image format information are set as follows: LR_first_flag=0, stereo_composition_type=1, stereo_flipping_flag=0, and quincunx_filtering_flag=0.

The scaler performs vertical 1/2 resizing of the received side-by-side format image 18010, and outputs the resized result. The reshaper stores the output image in the memory, performs image scanning using the top-bottom format, and outputs the scanned result. The scaler performs horizontal 2/1 resizing of the received top-bottom format image, and the formatter converts the received full-screen top-bottom format image into the horizontally interlaced format and outputs the conversion result.

Next, the following embodiment relates to an exemplary case in which the multiplexing format of the received 3D image corresponds to the side-by-side format and the output format is the checkerboard format. Individual fields of 3D image format information are set as follows: LR_first_flag=0, stereo_composition_type=1, Left_flipping_flag=0, spatial_flipping_flag=0, and quincunx_filtering_flag=0.

In the case of the checkerboard format image, if the broadcast receiver receives the 1/2-resized image 18020 in the same manner as in the side-by-side format image or the top-bottom format image, the broadcast receiver has only to convert a format of the received image into another format. In other words, the broadcast receiver does not perform additional image processing of the received side-by-side format image 18020 using the scaler and the reshaper, and controls the formatter to convert only the multiplexing format and output the converted result. In another embodiment, the broadcast receiver reads a left image and a right image from the received side-by-side format image, and performs 2/1 resizing about each of the read left image and the read right image. The broadcast receiver may perform 1/2 down-sampling on each of the full-screen left image and the full-screen right image using the checkerboard format, and mix two images (i.e., the full-screen left image and the full-screen right image) with each other.

Next, the following embodiment relates to an exemplary case in which the multiplexing format of the received 3D image corresponds to the checkerboard format, and the output format is the horizontally interlaced format. Individual fields of 3D image format information are set as follows: LR_first_flag=0, stereo_composition_type=4, spatial_flipping_flag=0, and quincunx_filtering_flag=0.

In the case of receiving the checkerboard format image 18030, the reshaper scans the image, reshapes the scanned image as the horizontal 1/2-sized top-bottom format image, stores the reshaped resultant image and outputs it. The scaler performs horizontal 2/1 resizing of the 1/2-sized top-bottom format image, and thus outputs a full-screen top-bottom format image. The formatter converts the full-screen top-bottom format into another format, and thus outputs the horizontally interlaced format image.

Figure 19:
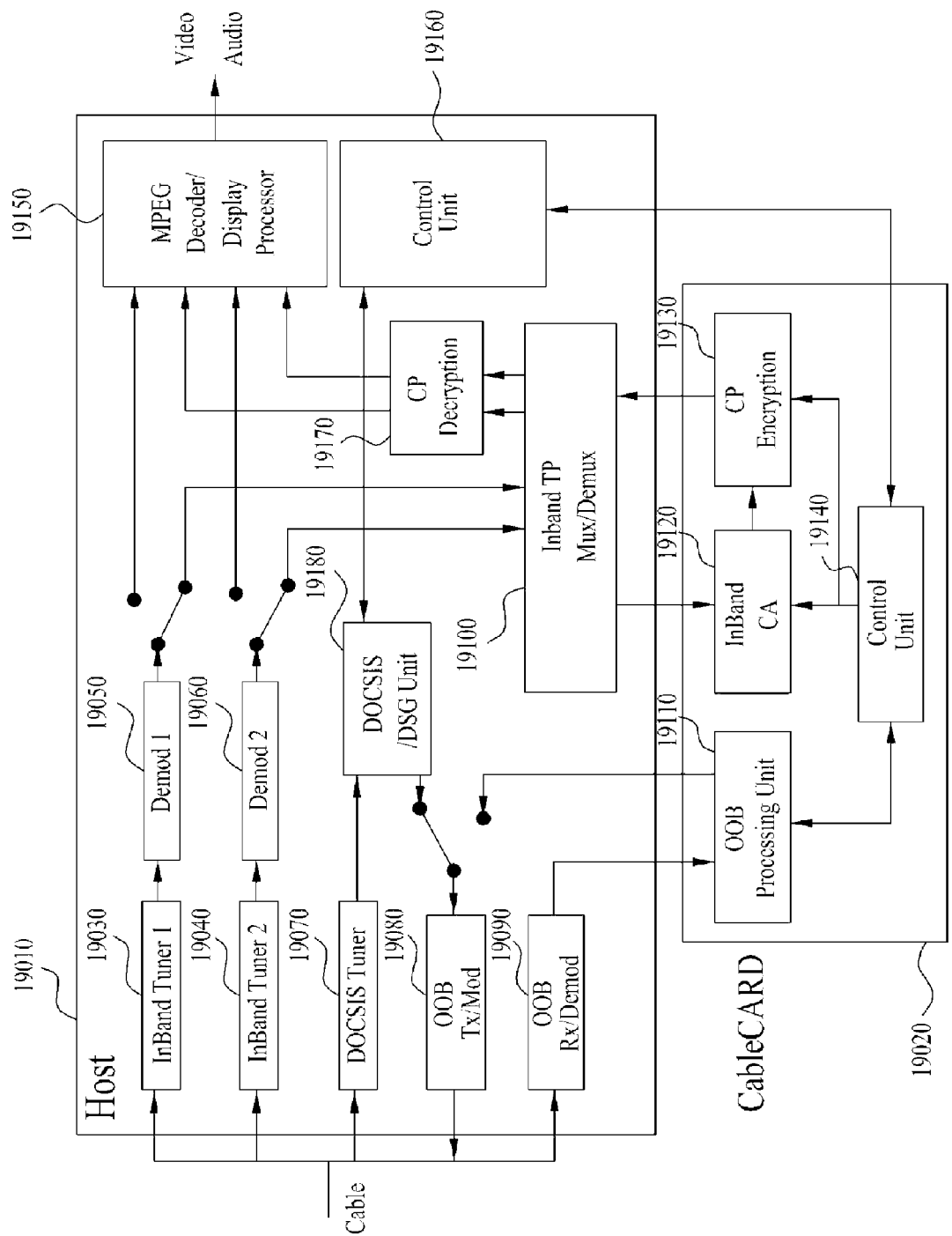
FIG. 19 is a block diagram illustrating a cable broadcast receiver according to an embodiment of the present invention.

FIG. 19 is a block diagram illustrating a cable broadcast receiver according to an embodiment of the present invention.

A two-way or bidirectional communication scheme of the cable broadcast system is classified into an OOB scheme for providing an upward service through an open cable and a DOCSIS Settop Gateway (DSG) scheme. The DSG scheme uses the cable modem based on Data Over Cable Service Interface Specifications (DOCSIS) of the receiver. The embodiment shown in FIG. 19 shows the cable broadcast receiver capable of simultaneously using the OOB scheme and the DSG scheme.

In FIG. 19, the cable broadcast receiver includes a host device 19010 and a cable card 19020 detachably connected to the host device 19010. The host device 19010 includes a first InBand tuner (Inband Tuber 1) 19030 and a second InBand tuner (InBand Tuner 2) 19040 that receive a terrestrial broadcast signal, a cable broadcast signal, and a satellite broadcast signal through an InBand. In addition, the host device 19010 includes a first demodulator (Demodulator 1) 19050 and a second demodulator (Demodulator 2) 19060 that demodulate the InBand broadcast signals received through the tuners 19030 and 19040. The host device 19010 includes a DOCSIS tuner 19070 for receiving the cable broadcast signal based on the DSG scheme; an OOB Tx/modulator (OOB Tx/Mod) 19080 for modulating/transmitting the OOB-based cable broadcast signal; and an OOB Rx/Demodulator (OOB Rx/Demod) 19090 for receiving/demodulating the OOB-based cable broadcast signal. The cable card 19020 includes an OOB processing unit 19110 for processing the OOB broadcast signal; an InBand CA unit 19120 for processing the InBand broadcast signal; DOCSIS/DSG Unit 19180 for processing the signal/data from the DOCSIS Tuner 19070a CP encryption unit 19130; and a control unit 19140 for acquiring/transmitting by controlling the processing of the cable card 19020. For convenience of description and better understanding of the present invention, the first InBand tuner (Inband Tuner 1) 19030, all of the second InBand tuner (Inband Tuner 2) 19040, and the OOB Rx/Demod 19090 may be generically called the receiving unit.

The host device 19010 of the cable broadcast receiver demodulates the InBandreceived broadcast signal, multiplexes the demodulated InBand broadcast signal through the InBand Transportstream Packet (TP) Mux/Demux 19100, and transmits the multiplexed InBand broadcast signal to the cable card 19020. The cable card 19020 processes the multiplexed InBand broadcast signal using the InBand CA unit 19120, encrypts the processed InBand broadcast signal using the CP encryption unit 19130, and transmits the encrypted broadcast signal to the host device 19010. The host device 19010 performs demultiplexing of the InBand broadcast signal using the InBand TP Mux/Demux 19100, the CP decryption unit 19170 decrypts the encrypted broadcast signal, and transmits the decrypted broadcast signal to the MPEG decoder/display processor 19150. The MPEG decoder/display processor 19150 decodes audio/video data, processes the decoded audio/video data, processes the decoded audio/video data according to the associated SI information (e.g., stereo format information), and outputs the processed audio/video data.

In the case of using the OOB broadcast signal, when the host device 19010 of the cable broadcast receiver receives/demodulates the OOB-received broadcast signal using the OOB Rx/Demod 19090 and transmits the demodulated broadcast signal to the cable card 19020, the control unit 19140 of the cable card processes the OOB broadcast signal using the OOB processing unit 19110, and transmits the processed broadcast signal to the control unit 19160 of the host device 19010.

In association with the present invention, the OOB broadcast signal received through the cable broadcast receiver passes through the aforementioned processing, and is transmitted to the control unit 19160 of the host device 19010. The control unit 19160 of the host device 19010 extracts SI information from the OOB broadcast signal. In addition, the host device 19010 extracts the SI information from the InBand broadcast signal using the control unit 19160. That is, the control unit 19160 contained in the host device 19010 extracts the VCT (LVCT or SVCT) from the OOB broadcast signal, obtains the stereo format information by parsing the VCT, extracts the PMT from the InBand broadcast signal, and obtains the stereo format information by parsing the PMT.

The cable broadcast receiver processes video data using the obtained stereo format information, and outputs the processed video data. In this case, although not shown in FIG. 19, the display processor 19150 may include the output formatter (i.e., Formatter) shown in FIGS. 12 and 17, or may include a scaler, a reshaper, a memory and a formatter that are contained in the output formatter. In another embodiment, the output formatter shown in FIGS. 12 and 17 may not be contained in the cable broadcast receiver. In this case, the display device connected to the cable broadcast receiver may include the output formatter, receive the audio/video data and the stereo format information from the cable broadcast receiver, and process the aforementioned 3D video data. A method for processing the 3D video data of the cable broadcast receiver according to the present invention will hereinafter be described with reference to FIG. 20.

Figure 20:
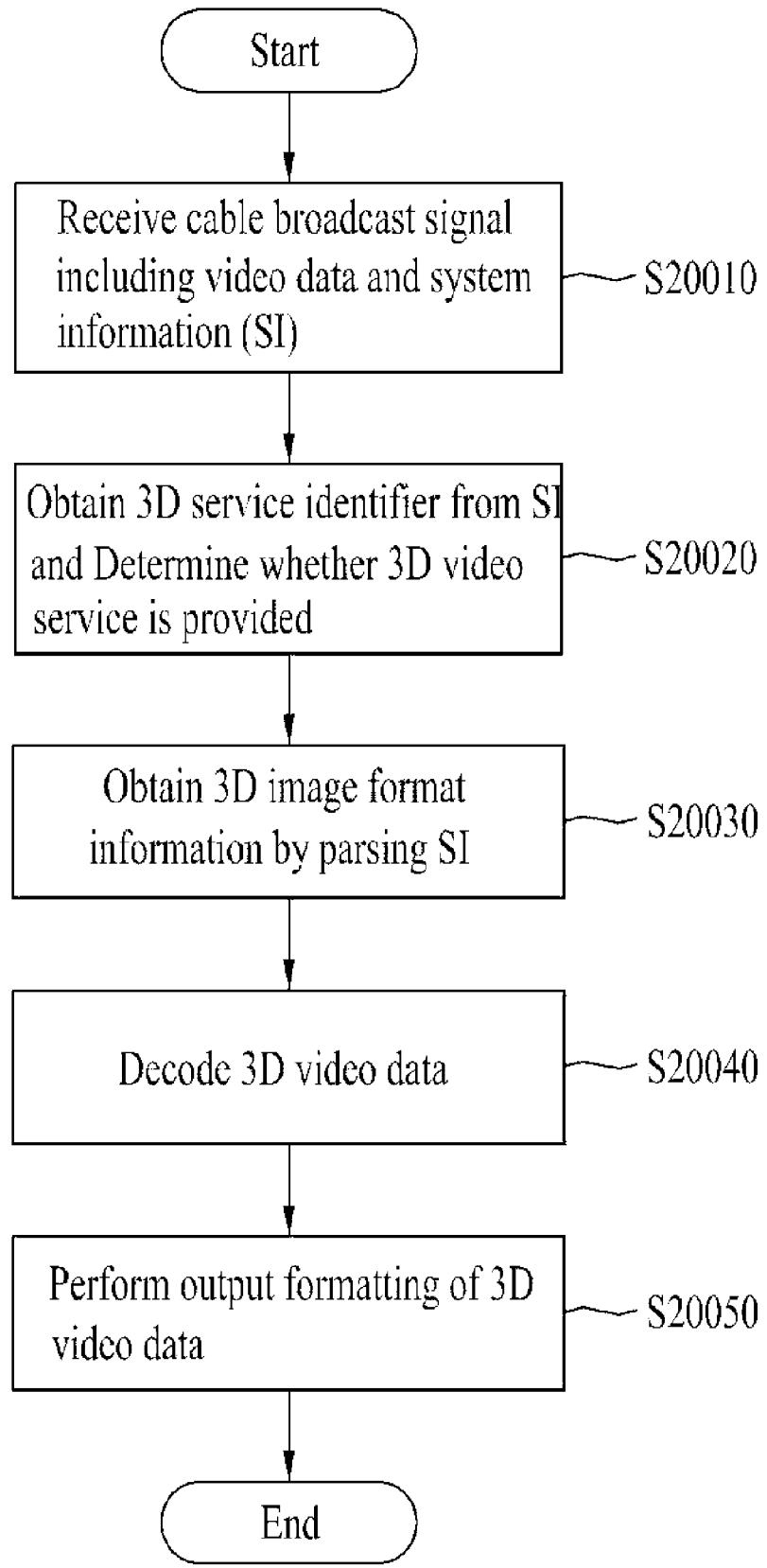
FIG. 20 is a flowchart illustrating a 3D video data processing method for use in a cable broadcast receiver according to an embodiment of the present invention.

FIG. 20 is a flowchart illustrating a 3D video data processing method for use in a cable broadcast receiver according to an embodiment of the present invention.

Referring to FIG. 20, the cable broadcast receiver receives the cable broadcast signal including video data and system information at step S20010. The cable broadcast receiver receives the broadcast signal including the video data through as an InBand signal, and receives the broadcast signal including the system information as an OOB signal. Some parts of the system information may also be contained in the InBand broadcast signal as necessary.

The cable broadcast receiver obtains the 3D service ID from the received system information, and determines whether the 3D broadcast service is provided through the corresponding channel at step S20020. The 3D service ID may correspond to the service_type descriptor or the channel_type descriptor of the VCT (SVCT or LVCT) from among the system information as previously stated in FIGS. 5 to 7.

The cable broadcast receiver obtains the 3D image format information by parsing the system information at step S20030. The 3D image format information may include configuration information of 3D images contained in the 3D video data. If the 3D video data includes stereoscopic images, information about not only the relationship between two-viewpoint images but also the format information of the two-viewpoint images may be contained in the 3D video data. In this case, the 3D image formation information may correspond to the aforementioned stereo format information. As previously described in FIGS. 5 to 8, the 3D image format information may be obtained from the VCT (LVCT or SVCT) or the PMT from among the system information, and the 3D image format information may include configuration information of the 3D image described in FIGS. 9 to 10.

The cable broadcast receiver determines the 3D video data at step S20040, and performs output formatting of the decoded 3D video data at step S20050. As described above, if the image processor for performing the output formatting of the 3D video data is contained in the cable broadcast receiver, some steps S20040 and S20050 are performed such that the 3D image may be output. If the image processor or the display device is installed separately from the cable broadcast receiver. The cable broadcast receiver may output the decoded 3D video data and the obtained 3D stereo format information to the corresponding image processor or the display device.

The operation for performing the output formatting of the decoded 3D video data is identical to those of FIGS. 12 to 18. In more detail, the operation for performing the output formatting of the 3D video data in the form of the 2D image display has already been described in FIGS. 12 to 15, and the operation for performing the output formatting of the 3D vide data in the form of the 3D image according to a specific display format has already been described in FIGS. 16 and 17.

The method disclosed in the present invention may be implemented in the form of program commands executable by a variety of computer means, and recorded on a computer-readable recording medium. The computer-readable recording medium may include program commands, data files, data structures, etc. individually or in combination. The program commands recorded on the medium may be ones specially designed and configured for the present invention or ones known and available to those skilled in computer software. Examples of the computer-readable recording medium include magnetic media such as a hard disk, a floppy disk and a magnetic tape, optical media such as a compact disc read only memory (CD-ROM) and a digital versatile disc (DVD), magneto-optical media such as a floptical disk, and hardware devices specially configured to store and execute program commands, such as a ROM, a random access memory (RAM) and a flash memory. Examples of the program commands include high-level language codes that may be executed by a computer using an interpreter, etc., as well as machine language codes such as those produced by a compiler. The above-stated hardware devices may be configured to operate as one or more software modules to perform the operation of the present invention, and vice versa.

Although the present invention has been described in conjunction with the limited embodiments and drawings, the present invention is not limited thereto. Those skilled in the art will appreciate that various modifications, additions and substitutions are possible from this description. Therefore, the scope of the present invention should not be limited to the description of the exemplary embodiments and should be determined by the appended claims and their equivalents.

MODE FOR THE INVENTION

Various embodiments have been described in the best mode for carrying out the invention.

INDUSTRIAL APPLICABILITY

As apparent from the above description, embodiments of the present invention may be wholly or partially applied to a digital broadcasting system. The broadcast receiver can process 3D video data such that a 3D effect intended by a 3D broadcast service provider is reflected in the 3D broadcast service. The broadcast receiver can effectively provide a 3D broadcast service while simultaneously minimizing the effect on a conventional 2D broadcast service.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for receiving a broadcast signal, the method comprising:
  receiving the broadcast signal including service data and signaling data for a service; and
  decoding the service data and the signaling data,
  wherein the service data includes frames comprising two constituent frames that are packed into one frame,
  wherein the two constituent frames form a left view and a right view of a stereo view scene,
  wherein the signaling data includes service type information indicating a category of the service,
  wherein the broadcast signal includes image format information,
  wherein the image format information includes arrangement type information indicating a type of packing arrangement of the frames,
  wherein the image format information further includes spatial flipping information indicating that one of the two constituent frames is spatially flipped relative to its intended orientation for display, and
  wherein the image format information further includes image flipped information indicating which one of the two constituent frames is flipped.

2. The method according to claim 1, further comprising:
  processing the decoded service data including samples of the constituent frames appropriately for display using the image format information, and outputting the processed service data.

3. The method according to claim 1, wherein the service type information and the image format information are contained in a virtual channel table (VCT) received through an Out Of Band (OOB).

4. The method according to claim 1, wherein the image format information is contained in a program map table (PMT) received through an InBand.

5. The method according to claim 1, wherein the image format information further includes:
  LR first information indicating that relationship between the frame packed constituent frames, and
  sampling information indicating that each color component plane of each constituent frame is quincunx sampled.

6. The method according to claim 2, wherein the processing and outputting of the decoded service data using the image format information includes:
  scanning at least one of the left view and the right view, and reshaping the scanned view;
  resizing at least one of the left view and the right view; and
  formatting the left view and the right view according to a multiplexing format for displaying the left view and the right view.

7. A broadcast receiver comprising:
  a receiving unit for receiving the broadcast signal including service data and signaling data for a service; and
  a decoder for decoding the service data and the signaling data,
  wherein the service data includes frames comprising two constituent frames that are packed into one frame,
  wherein the two constituent frames form a left view and a right view of a stereo view scene,
  wherein the signaling data includes service type information indicating a category of the service,
  wherein the broadcast signal includes image format information,
  wherein the image format information includes arrangement type information indicating a type of packing arrangement of the frames,
  wherein the image format information further includes spatial flipping information indicating that one of the two constituent frames is spatially flipped relative to its intended orientation for display, and
  wherein the image format information further includes image flipped information indicating which one of the two constituent frames is flipped.

8. The broadcast receiver according to claim 7, wherein the decoder further processes the decoded service data including samples of the constituent frames appropriately for display using the image format information, and outputting the processed service data.

9. The broadcast receiver according to claim 7, wherein the service type information and the image format information are contained in a virtual channel table (VCT) received through an Out Of Band (00B).

10. The broadcast receiver according to claim 7, wherein the image format information is contained in a program map table (PMT) received through an InBand.

11. The broadcast receiver according to claim 7, wherein the image format information further includes:

LR first information indicating that relationship between the frame packed constituent frames, and sampling information indicating that each color component plane of each constituent frame is quincunx sampled.

12. The broadcast receiver according to claim 8, wherein the decoder further includes:

a reshaper for reshaping at least one of the left view and the right view, and reshaping the scanned view;

a resizer for resizing at least one of the left view and the right view; and a formatter for formatting the left view and the right view according to a multiplexing format for displaying the left view and the right view.

* * * * *